US012569871B2

(12) United States Patent
Vienne et al.

(10) Patent No.: US 12,569,871 B2
(45) Date of Patent: Mar. 10, 2026

(54) MOUNTING SYSTEM FOR USE IN CONNECTION WITH PAINTING

(71) Applicant: X-Axis Finishing Solutions, LLC, Melville, NY (US)

(72) Inventors: Daniel J. Vienne, Melville, NY (US); Charles E. Vienne, Hilton Head Island, SC (US)

(73) Assignee: X-Axis Finishing Solutions, LLC, Melville, NY (US)

(*) Notice: Subject to any disclaimer, the term of this patent is extended or adjusted under 35 U.S.C. 154(b) by 0 days.

(21) Appl. No.: 18/523,310

(22) Filed: Nov. 29, 2023

(65) Prior Publication Data

US 2024/0173735 A1 May 30, 2024

Related U.S. Application Data

(60) Provisional application No. 63/428,893, filed on Nov. 30, 2022.

(51) Int. Cl.
*F16B 2/14* (2006.01)
*A47B 23/02* (2006.01)
*B05B 13/02* (2006.01)

(52) U.S. Cl.
CPC ...... *B05B 13/0285* (2013.01); *B05B 13/0292* (2013.01)

(58) Field of Classification Search
CPC . B05B 13/0285; B05B 13/0292; B05B 13/02; A47B 23/02; A47B 23/025; B25B 1/08; F16B 2/14; F16B 2/18
USPC .... 248/317, 323, 324, 686, 689, 468, 475.1, 248/476, 479, 495, 447.1, 447.2, 213.1, 248/213.2, 220.21, 220.22, 221.11, 248/222.11, 222.12, 222.13, 222.52, 248/223.41, 224.51, 224.61, 224.7, 224.8, 248/231.31
See application file for complete search history.

(56) References Cited

U.S. PATENT DOCUMENTS

| | | | | | |
|---|---|---|---|---|---|
| 2,364,986 | A | * | 12/1944 | Law | B05B 13/02 118/500 |
| 3,630,588 | A | * | 12/1971 | Baker | B44D 3/04 312/231 |
| 4,361,931 | A | | 12/1982 | Schnelle et al. | |
| 4,577,843 | A | | 3/1986 | Milwain | |

(Continued)

OTHER PUBLICATIONS

Rockler, "Rockler Sure-Hook 360 | Rockler Woodworking and Hardware," https://www.rockler.com/rockler-sure-hooks-360?sid=V91075&gclid=CjwKCAiA68ebBhB-EiwALVC-NiFmsmOWmDfo5Dpgc_a18-iOrqEPQ7nF7eLjQnS%E2%80%A6, obtained from Internet on Nov. 14, 2022, 5 pages.

(Continued)

*Primary Examiner* — Terrell L Mckinnon
(74) *Attorney, Agent, or Firm* — Ryan, Mason & Lewis, LLP

(57) ABSTRACT

A mounting device comprises a collar part including a plurality of ramp portions on an interior side of the collar part, and a rotatable hub part comprising a plurality of protruding portions. The collar part is positioned around the rotatable hub part. When the rotatable hub part is rotated, respective ones of the plurality of protruding portions are configured to press against respective ones of the plurality of ramp portions and exert a force on the collar part which increases a dimension of the collar part.

17 Claims, 20 Drawing Sheets

HORIZONTAL DRY RACK ARRANGEMENT WITH BACK FACE OF CAB. DOORS "UP"

(56) References Cited

U.S. PATENT DOCUMENTS

| | | | | |
|---|---|---|---|---|
| 5,009,382 | A * | 4/1991 | Huffaker | A47B 23/02 248/442.2 |
| 5,551,980 | A * | 9/1996 | Turnbo | B05B 13/0285 118/500 |
| 5,846,016 | A * | 12/1998 | Martinez | B05B 13/02 403/384 |
| 6,609,338 | B2 * | 8/2003 | Hightower | F16B 5/0635 52/204.64 |
| 6,641,668 | B1 | 11/2003 | Edgerton | |
| 6,959,582 | B2 * | 11/2005 | Peterhansel | B21D 28/10 72/395 |
| 7,527,150 | B2 * | 5/2009 | Tong | A47F 7/024 248/317 |
| D612,227 | S | 3/2010 | Banasik et al. | |
| D628,040 | S | 11/2010 | Banasik et al. | |
| 7,870,834 | B1 * | 1/2011 | Cundiff | B05B 13/0285 248/188.7 |
| 8,066,267 | B2 | 11/2011 | Schaerer | |
| 8,136,781 | B2 | 3/2012 | Krohmer | |
| 8,177,207 | B2 | 5/2012 | Waters | |
| 8,376,292 | B2 * | 2/2013 | Cicco | F16M 13/022 248/176.1 |
| 8,707,976 | B2 * | 4/2014 | Bauer | B05B 13/0285 135/95 |
| 8,807,072 | B2 * | 8/2014 | Shimai | B05C 5/02 118/320 |
| 8,828,197 | B2 * | 9/2014 | Ryan | B05B 13/02 118/500 |
| 9,016,664 | B1 * | 4/2015 | Powers | B05B 13/0285 254/8 R |
| 2007/0175390 | A1 * | 8/2007 | Allen, II | B05B 13/0292 118/505 |
| 2008/0042034 | A1 * | 2/2008 | Krohmer | B05B 13/02 248/339 |
| 2008/0120865 | A1 * | 5/2008 | Smith | F26B 25/003 34/239 |
| 2008/0122235 | A1 | 5/2008 | Bauer | |
| 2015/0101251 | A1 * | 4/2015 | Cui | E05F 15/611 49/138 |
| 2016/0256884 | A1 * | 9/2016 | Calles | B25H 1/0042 |
| 2018/0216781 | A1 * | 8/2018 | Hall | F16B 2/065 |

OTHER PUBLICATIONS info@stakracks.com, "Stak Rack—Painting Tool for Door | Trim | Cabinets," https://www.stakracks.com, obtained from Internet on Nov. 14, 2022, 5 pages.

* cited by examiner

*FIG. 01:01*
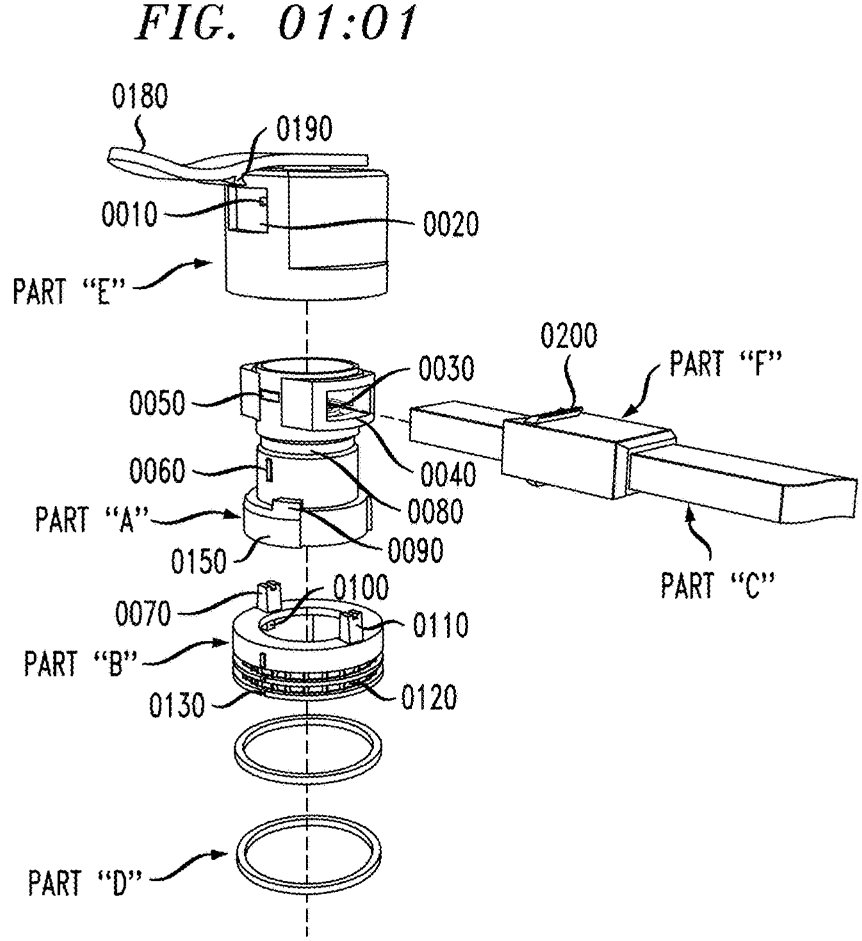
*FIG. 01:02*
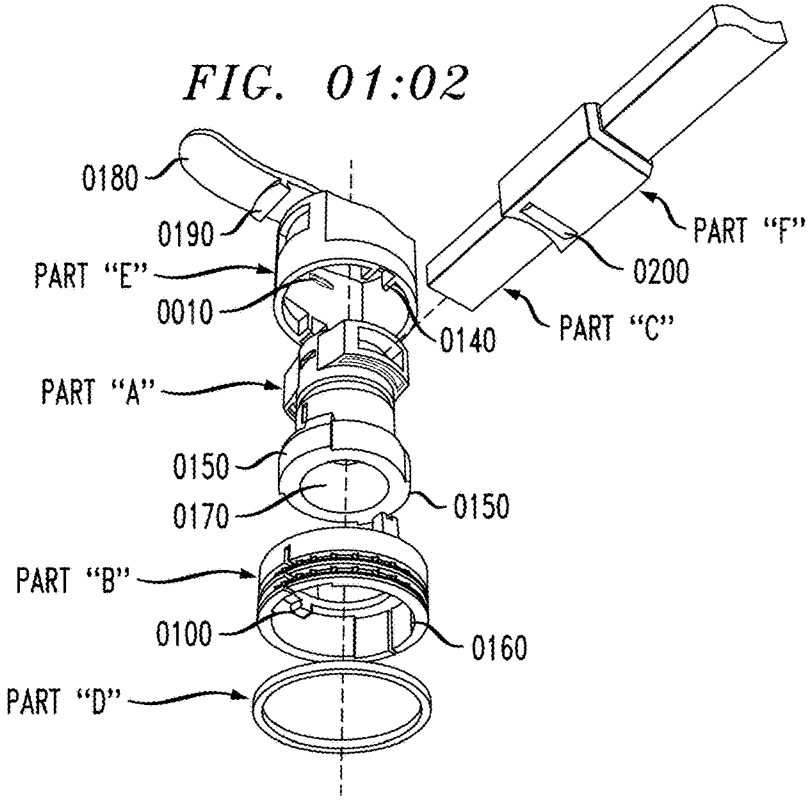

FIG. 02:01
STEP #1
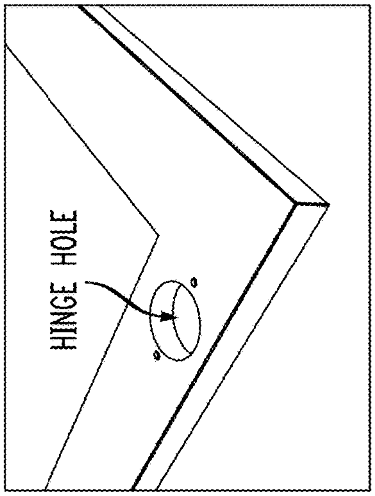
CAB. DOOR HINGE HOLE (TYP.)
FIG. 02:02
STEP #2
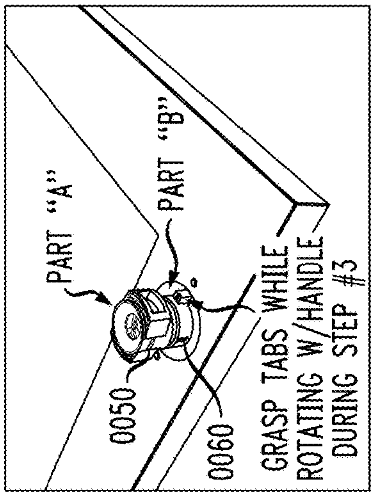
CAB. DOOR TOOL INSTERTED IN CAB. DOOR HINGE HOLE. (UNLOCKED POS. 0°)
FIG. 02:03
STEP #3
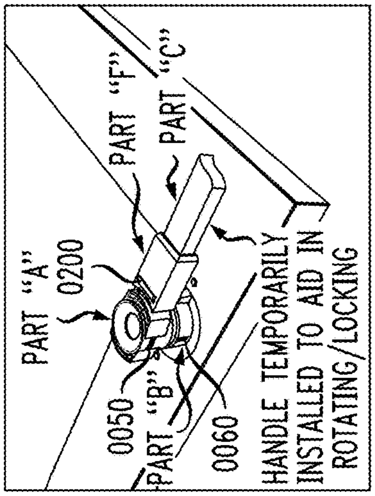
TEMPORARILY INSTALL HANDLE TO AID IN ROTATING PART "A" TO LOCK POS. (+90°)
FIG. 02:04
STEP #4
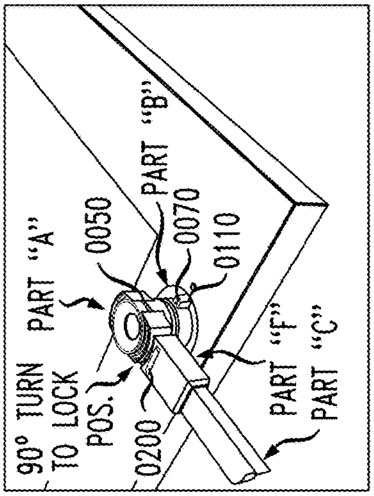
TOOL "A" ROTATED 90° TO LOCK POS.
FIG. 02:05
STEP #5
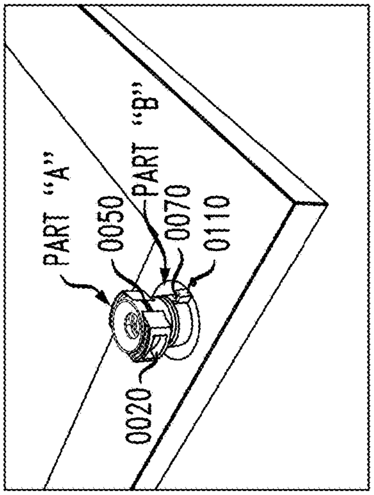
HANDLE REMOVED READY FOR PAINT SHIELD & HANDLE INSTALLATION
FIG. 02:06
STEP #6
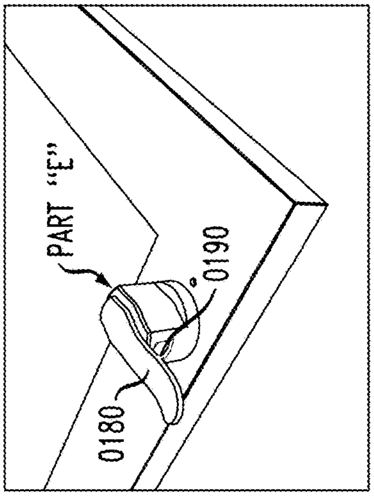
PAINT SHIELD/LOCK INSTALLED READY FOR HANDLE INSTALLATION

*FIG. 03:01*
STEP #7
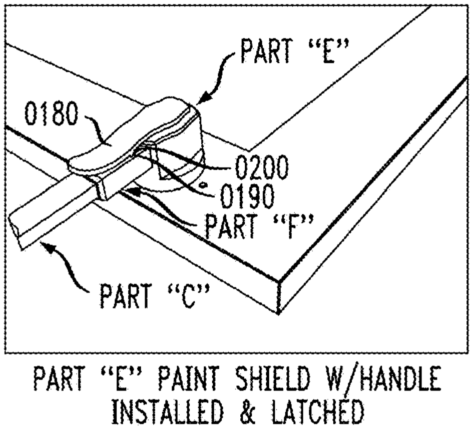
PART "E" PAINT SHIELD W/HANDLE INSTALLED & LATCHED
*FIG. 03:02*
STEP #8
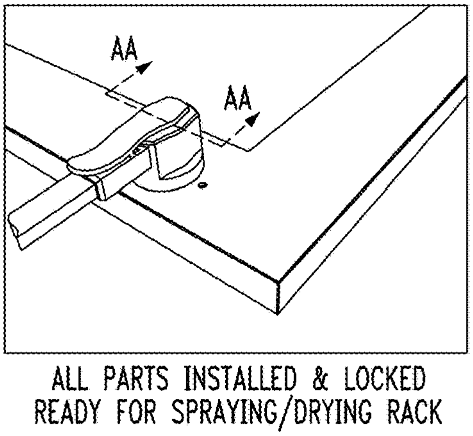
ALL PARTS INSTALLED & LOCKED READY FOR SPRAYING/DRYING RACK
*FIG. 03:03*
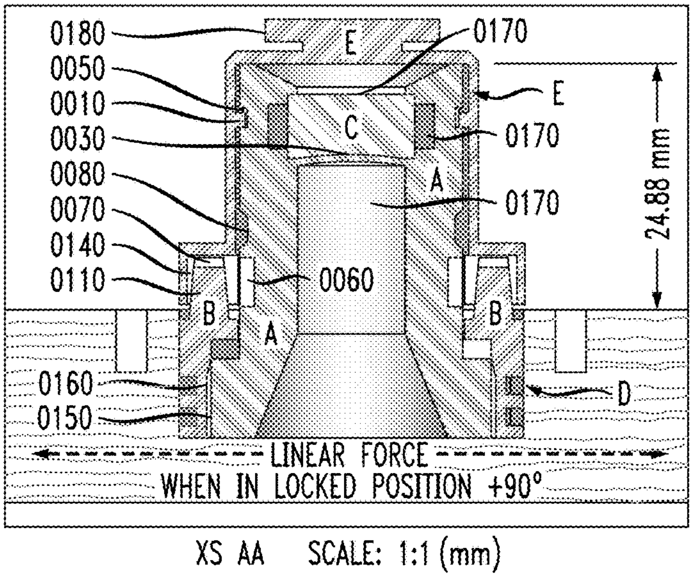
XS AA SCALE: 1:1 (mm)
*FIG. 03:04*
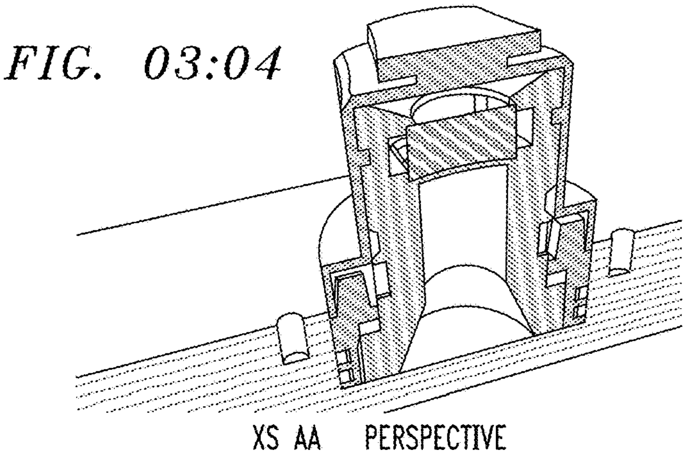
XS AA PERSPECTIVE FIG. 03:05
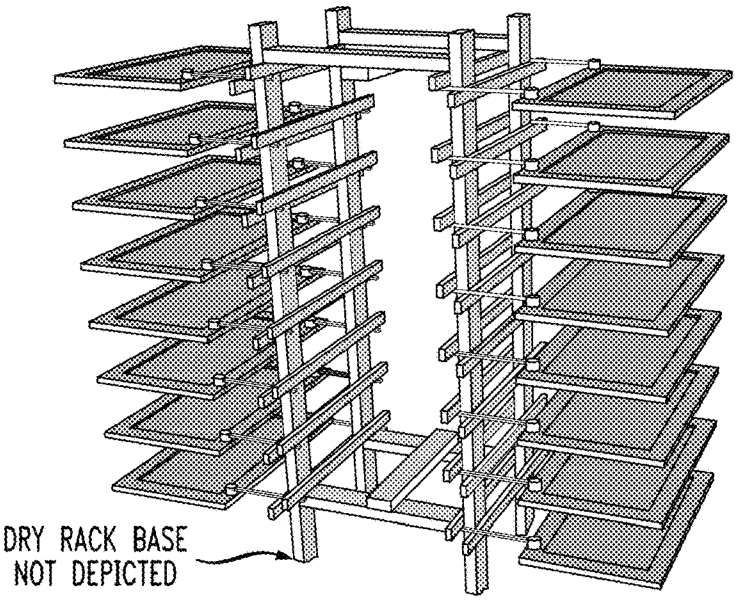
HORIZONTAL DRY RACK ARRANGEMENT WITH BACK FACE OF CAB. DOORS "UP"
FIG. 03:06
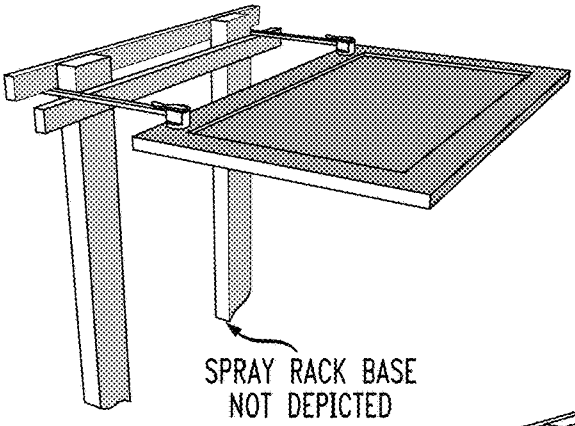
HORIZONTAL SPRAYING POSITION #1 WITH BACK FACE OF CAB. DOORS "UP"
FIG. 03:07
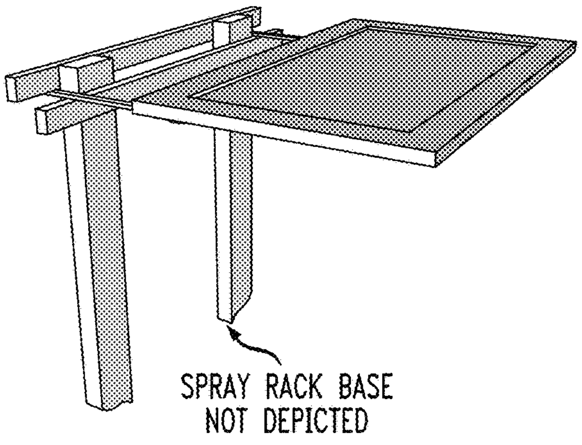
HORIZONTAL SPRAYING POSITION #2 WITH FRONT FACE OF CAB. DOORS "UP"

FIG. 04:01
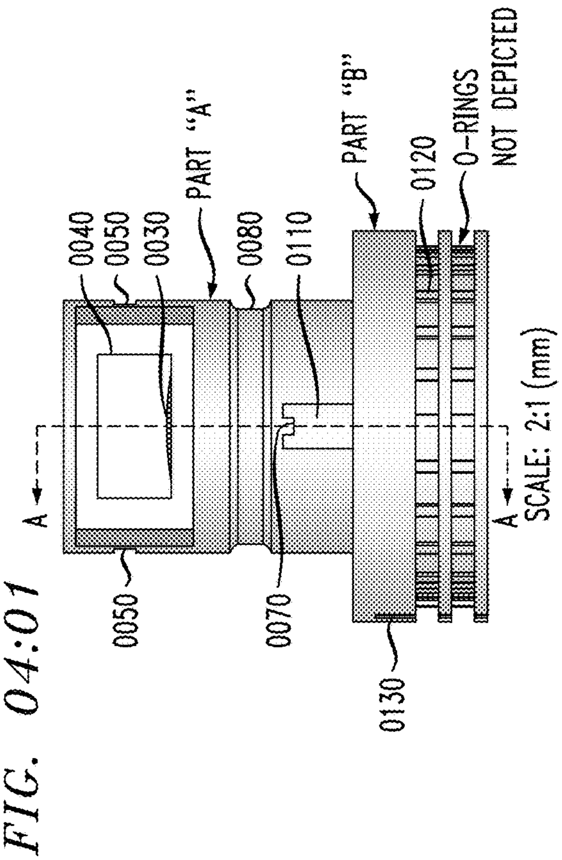
FIG. 04:02
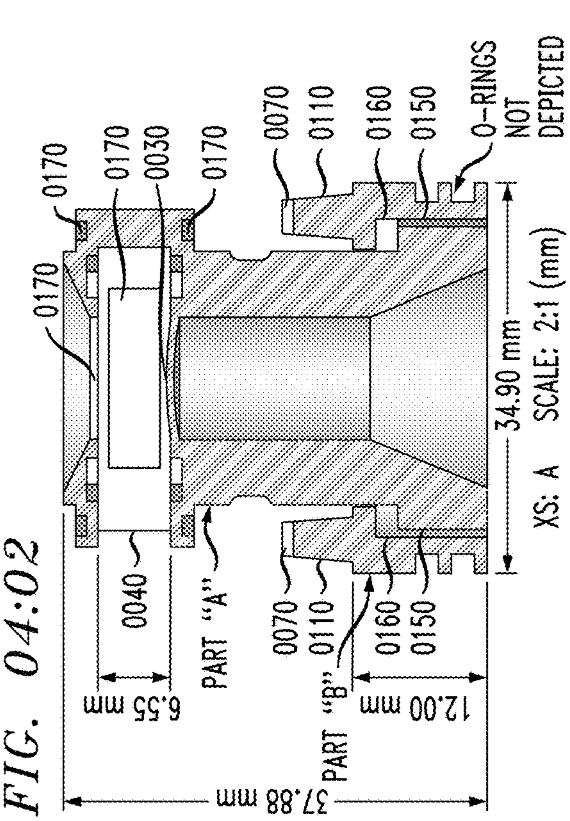
FIG. 04:03
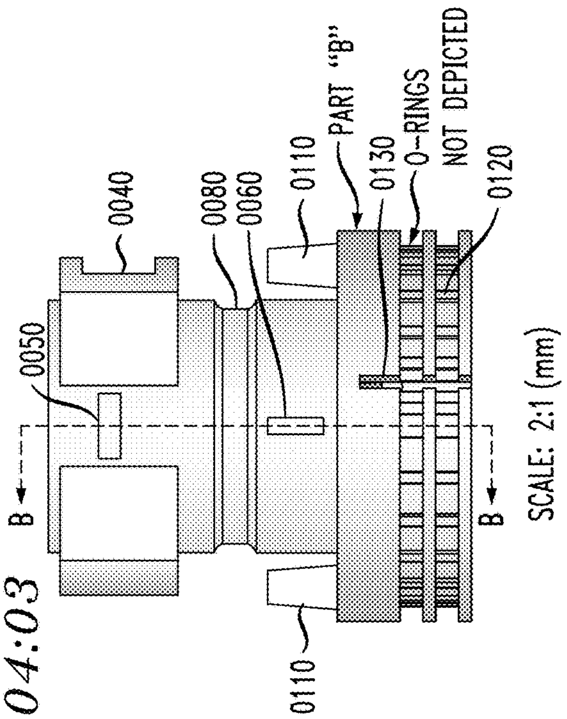
FIG. 04:04
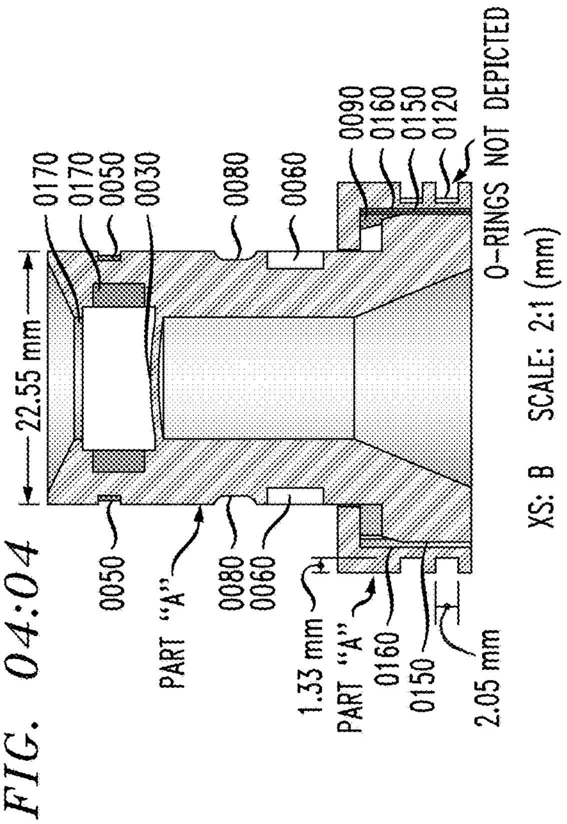

FIG. 05:02
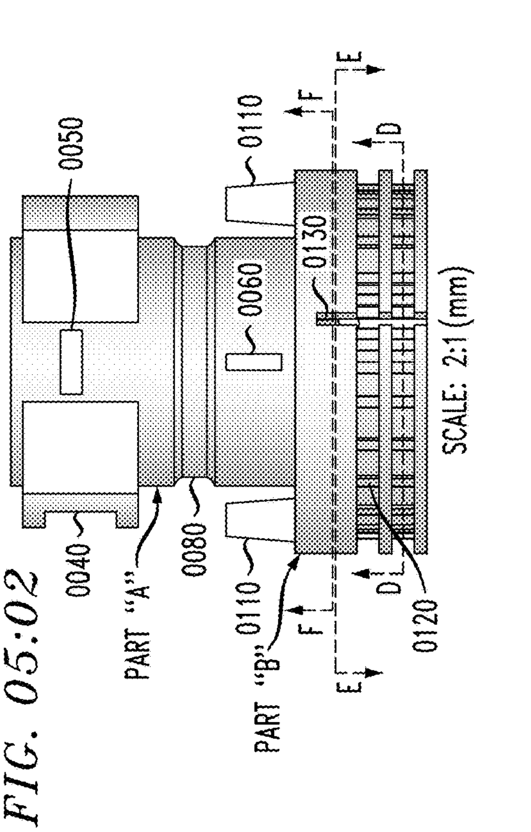
FIG. 05:04
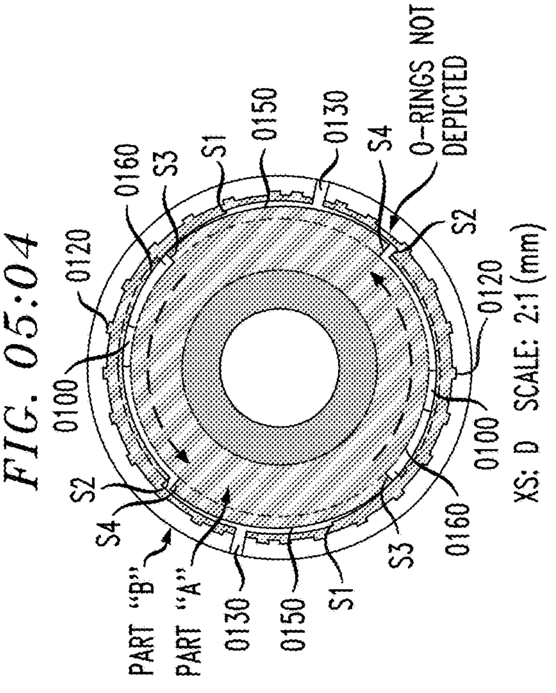
FIG. 05:01
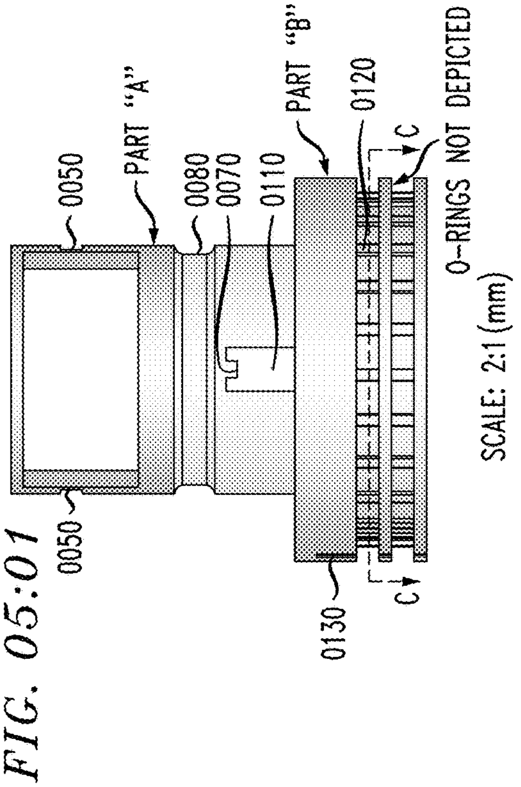
FIG. 05:03
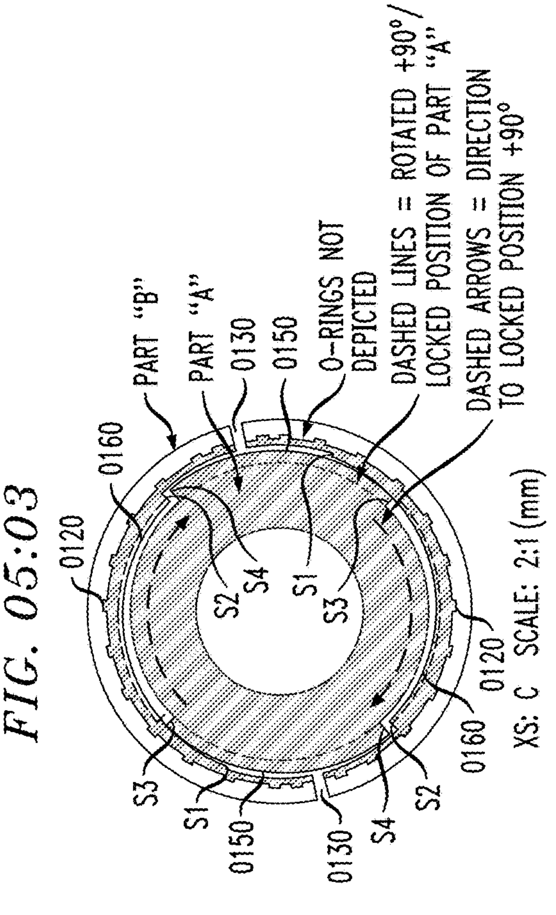

FIG. 06:01
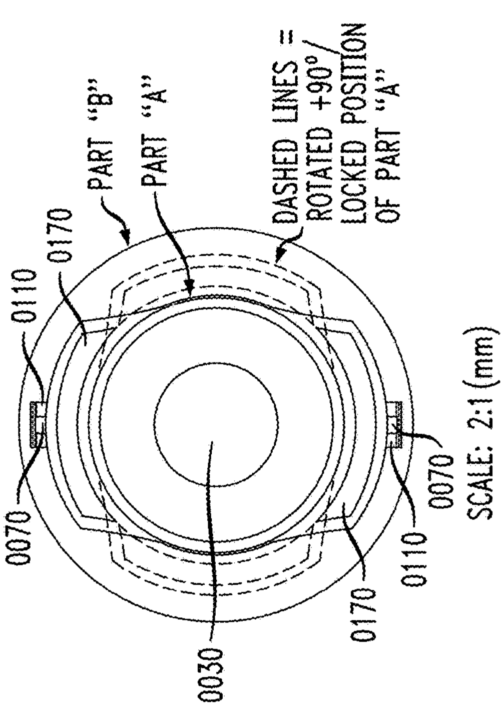
FIG. 06:02
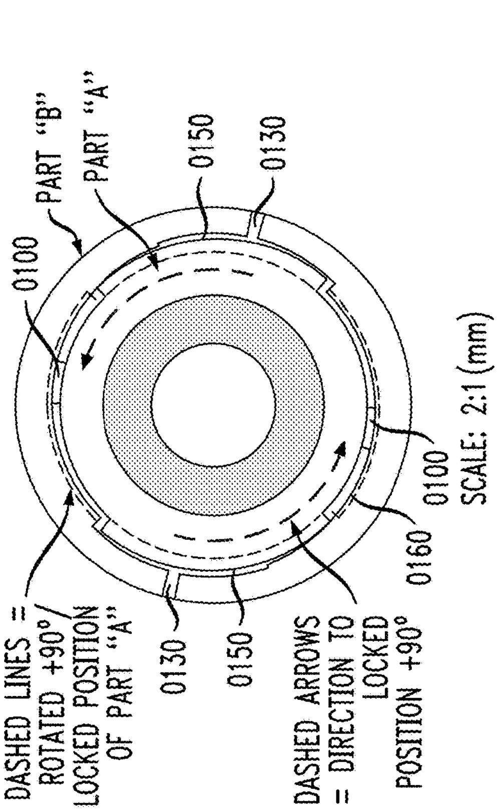
FIG. 06:03
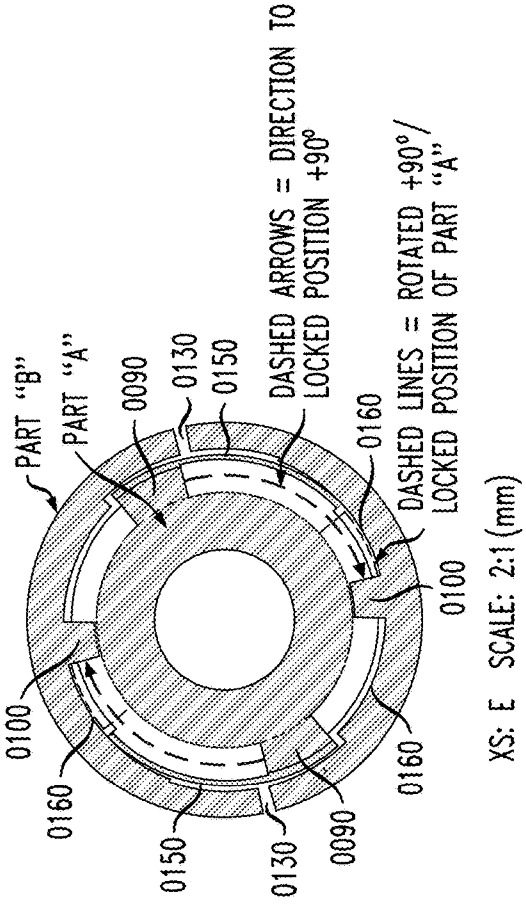
FIG. 06:04
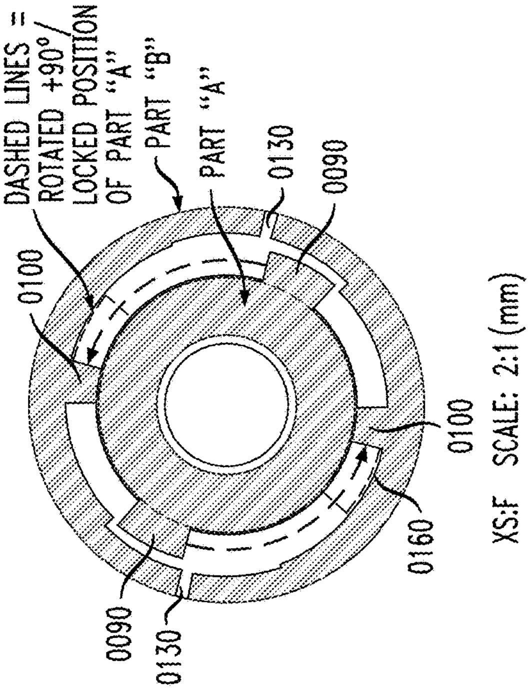

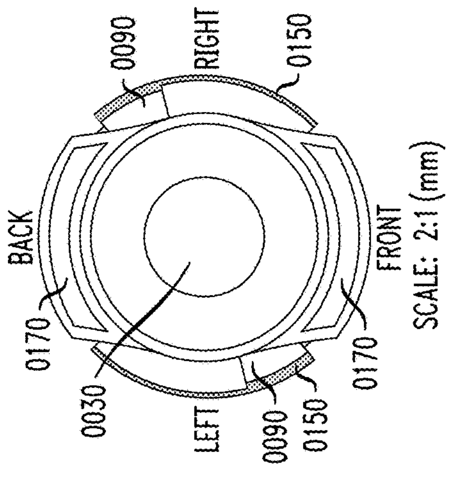
FIG. 07:03
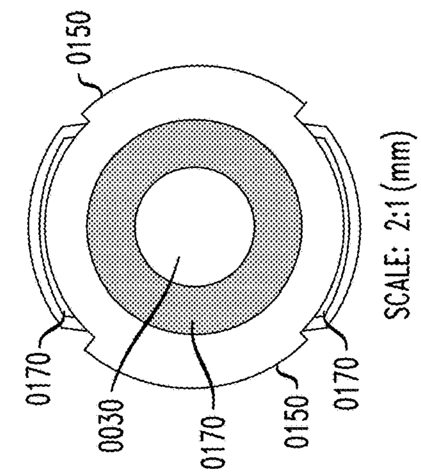
FIG. 07:06
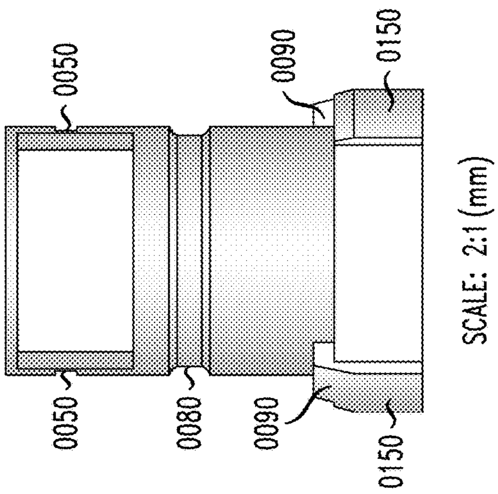
FIG. 07:02
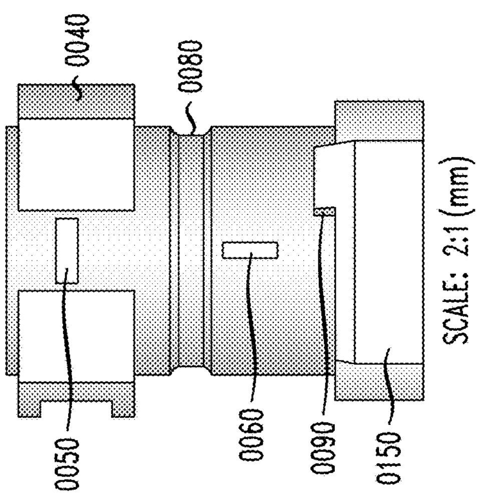
FIG. 07:05
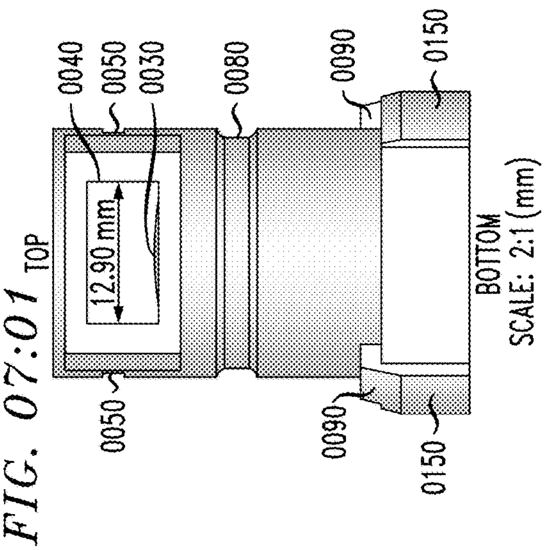
FIG. 07:01
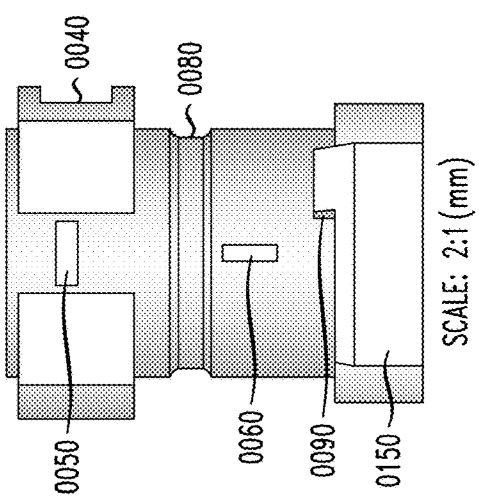
FIG. 07:04

FIG. 08:01
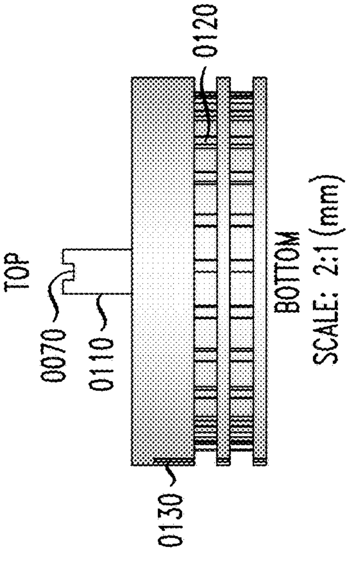
FIG. 08:02
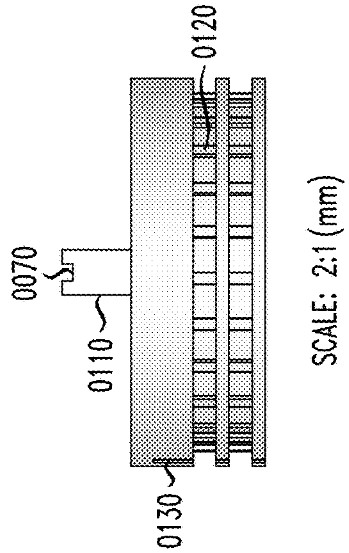
FIG. 08:03
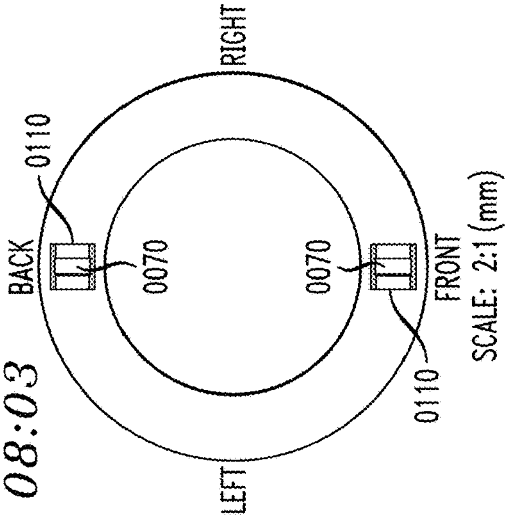
FIG. 08:04
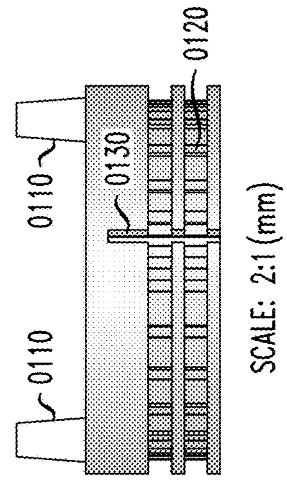
FIG. 08:05
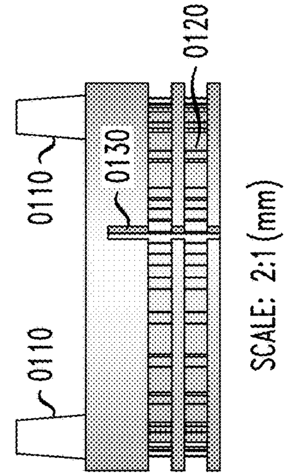
FIG. 08:06
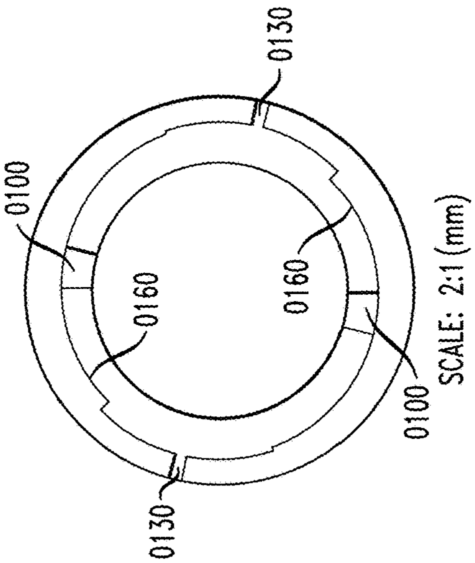

FIG. 09:02
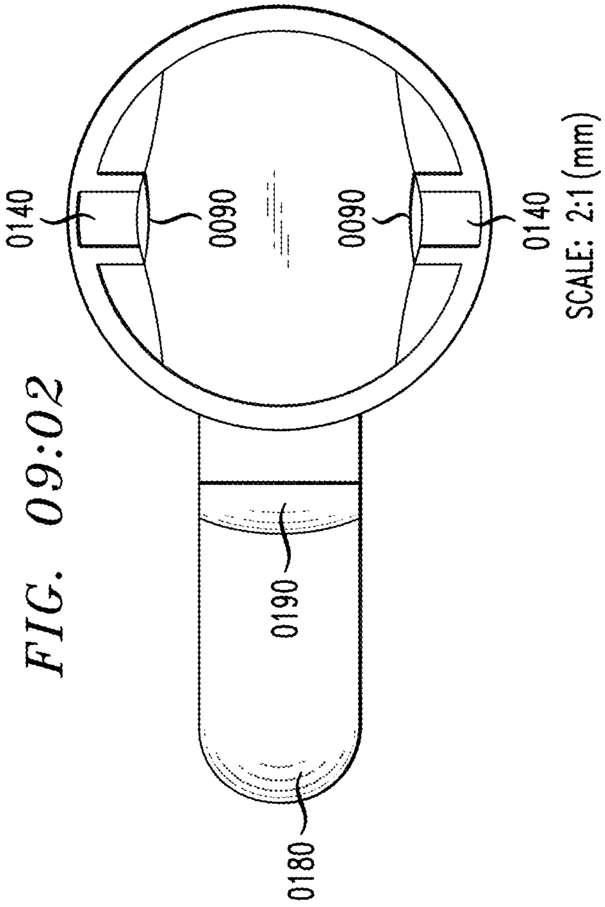
FIG. 09:03
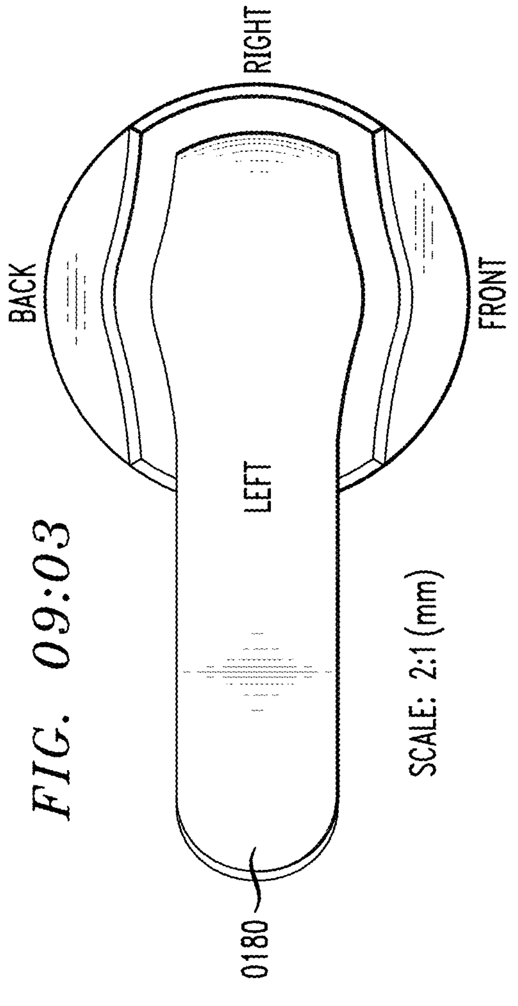
FIG. 09:01
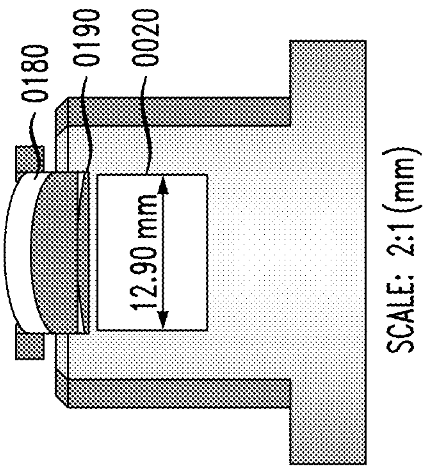

*FIG. 09:04*
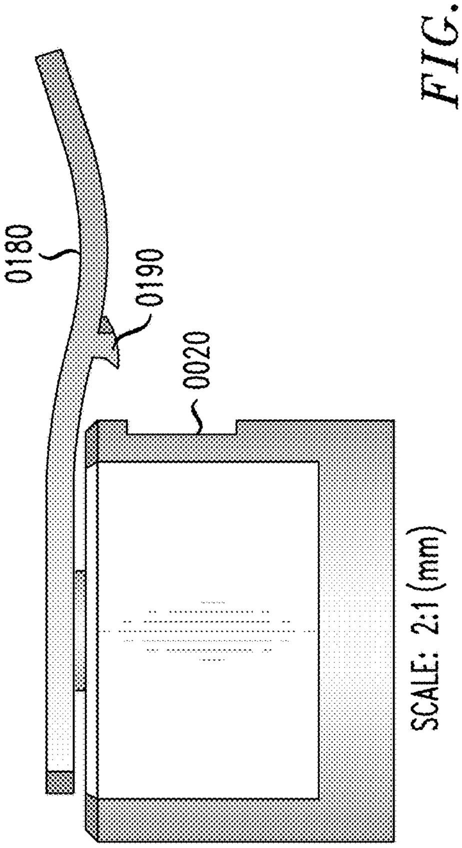
*FIG. 09:05*
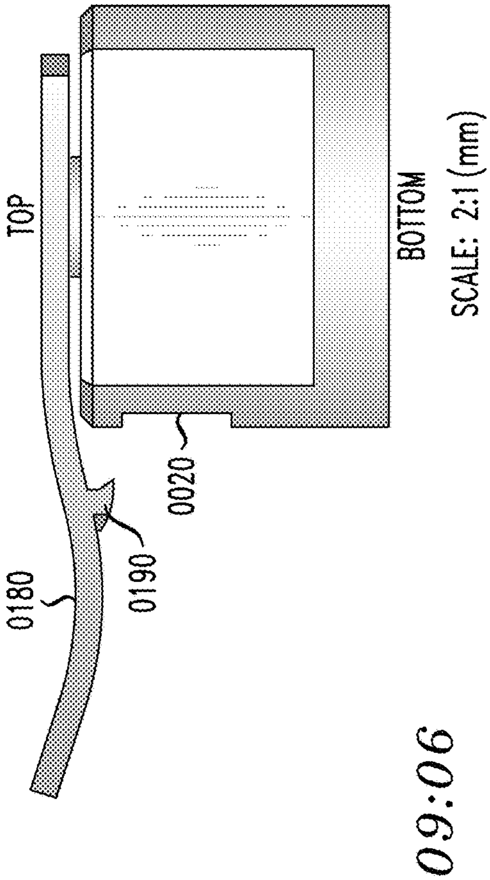
*FIG. 09:06*
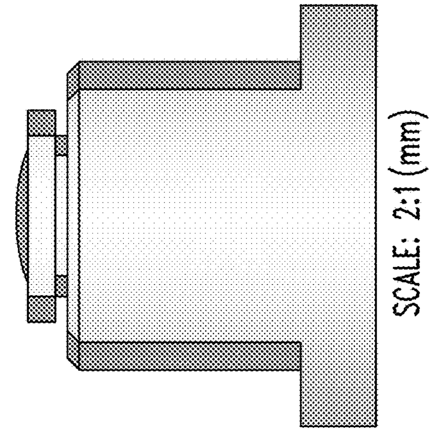

FIG. 10:01
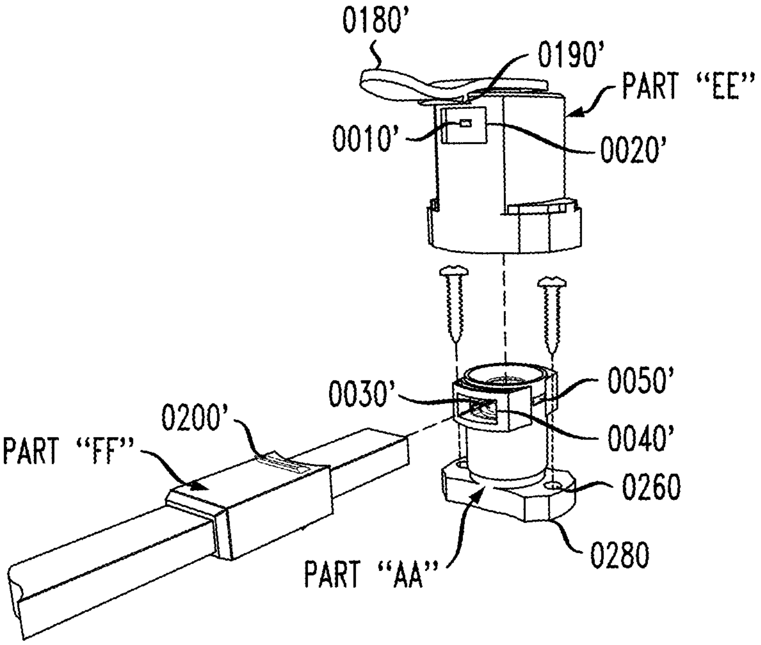
FIG. 10:02
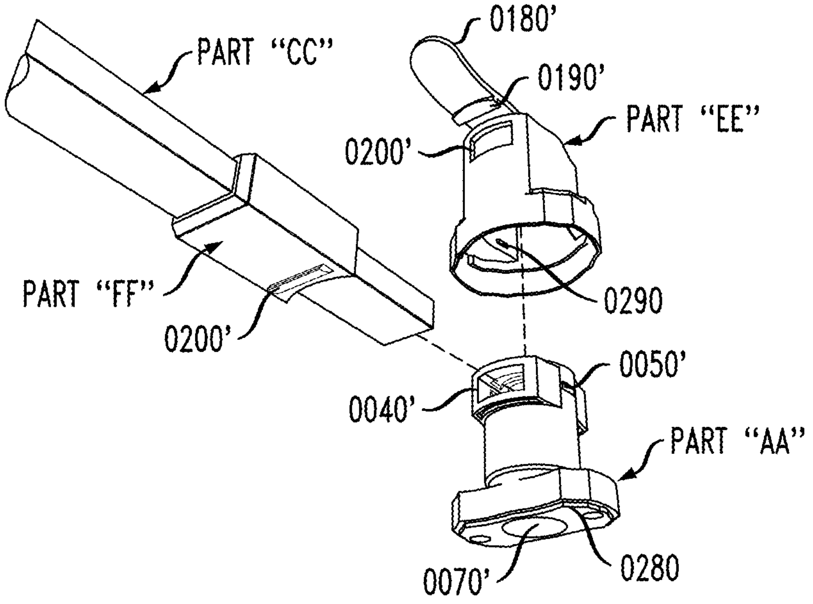

FIG. 11:01
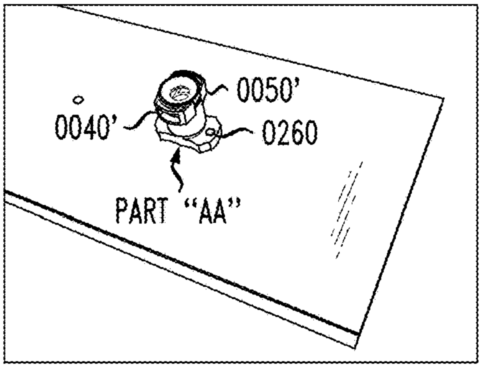
PART "AA" INSTALLED
READY FOR HANDLE & PAINT SHIELD
FIG. 11:02
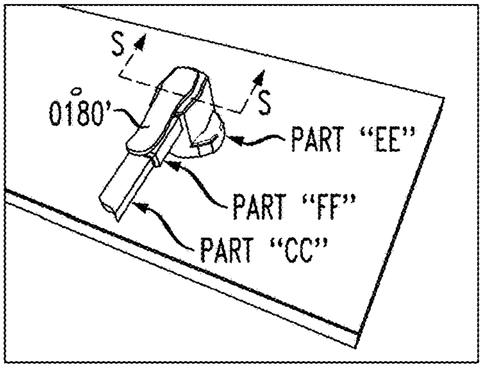
HANDLE & PAINT SHIELD INSTALLED
FIG. 11:03
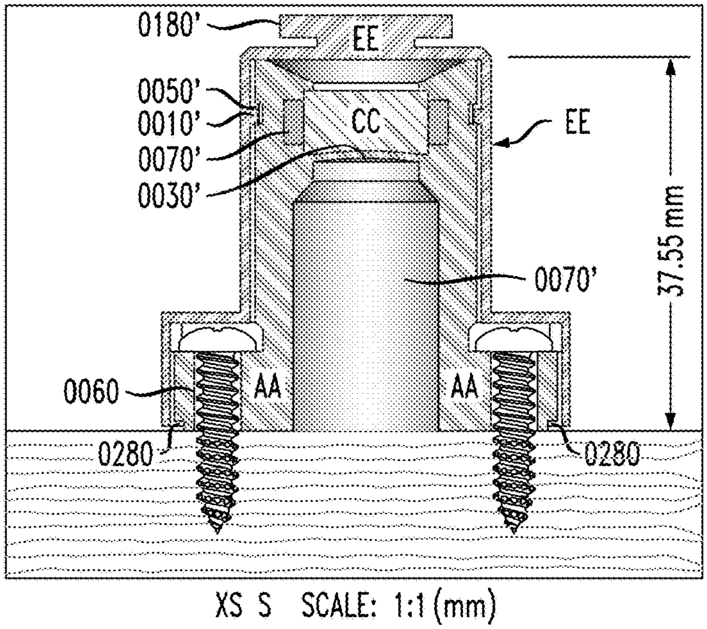
XS S SCALE: 1:1 (mm)
FIG. 11:04
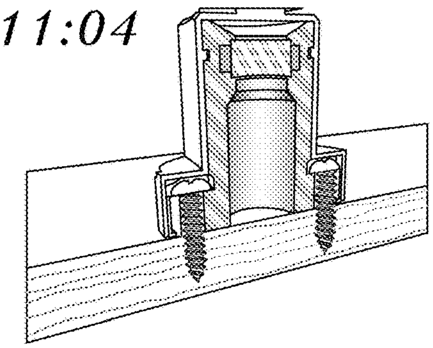
XS S

*FIG. 11:05*
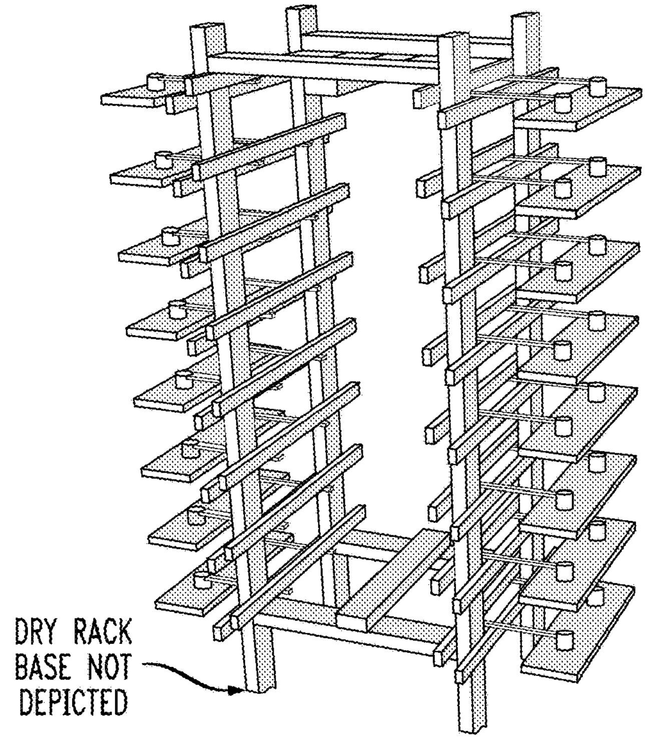
HORIZONTAL DRY RACK ARRANGEMENT WITH BACK FACE OF DRAWER FRONTS "UP"
*FIG. 11:06*
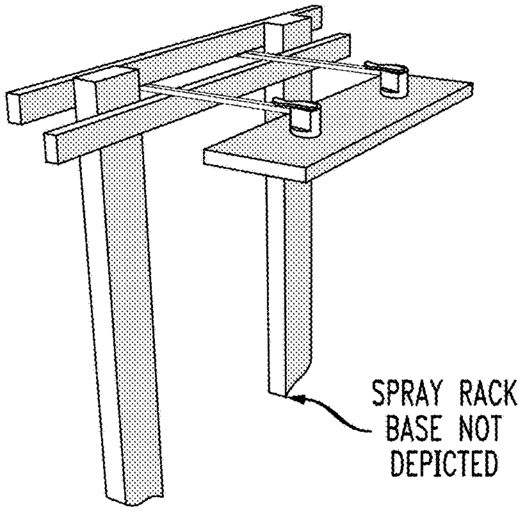
HORIZONTAL SPRAYING POSITION #1 WITH BACK FACE OF DRAWER FRONTS "UP"
*FIG. 11:07*
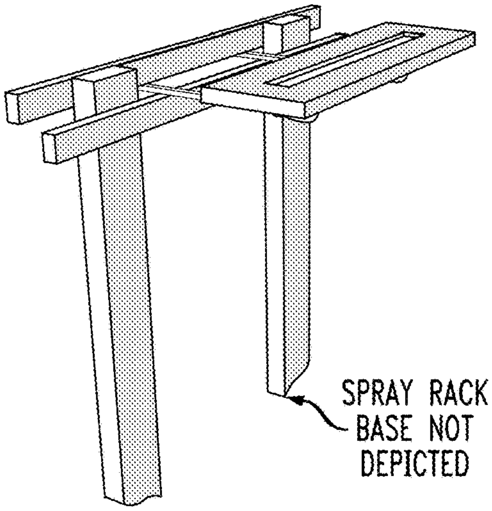
HORIZONTAL SPRAYING POSITION #2 WITH FRONT FACE OF DRAWER FRONTS "UP"

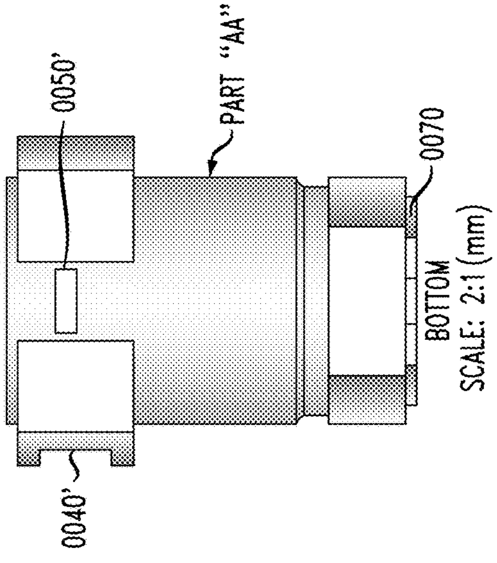
FIG. 12:01
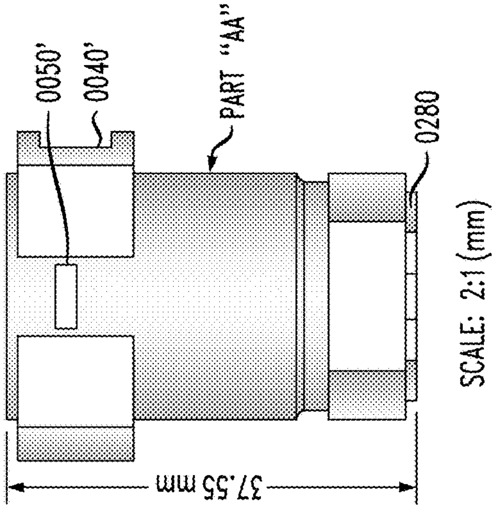
FIG. 12:02
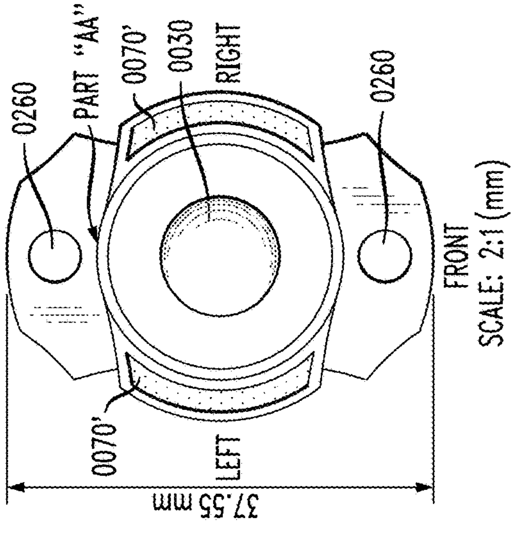
FIG. 12:03
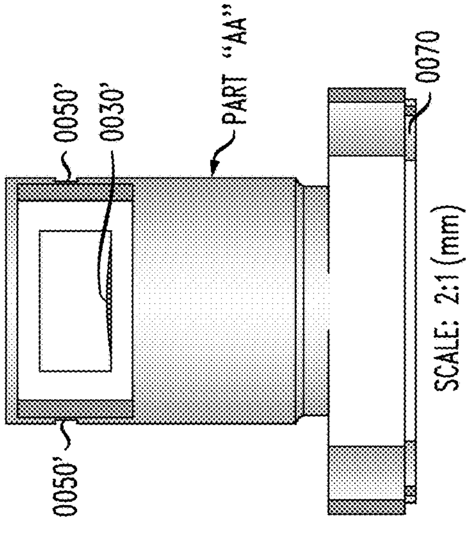
FIG. 12:04
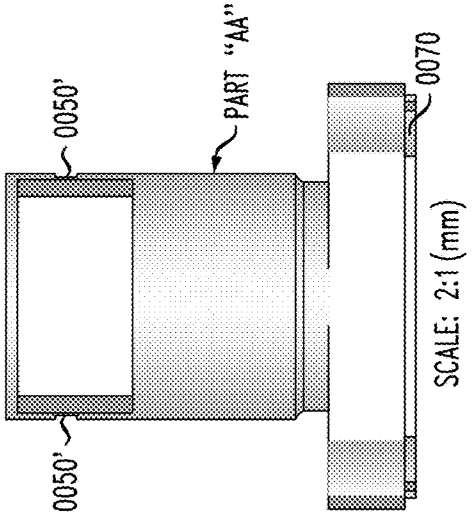
FIG. 12:05
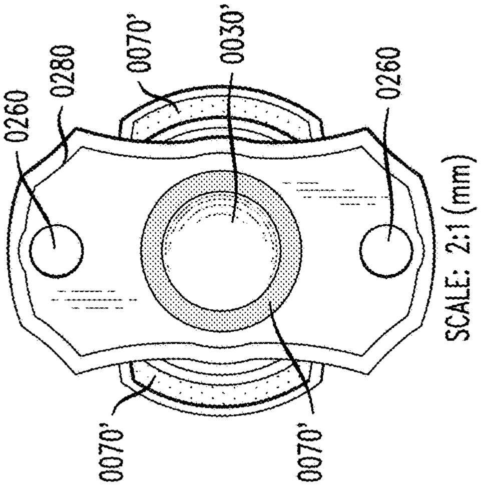
FIG. 12:06

FIG. 13:01
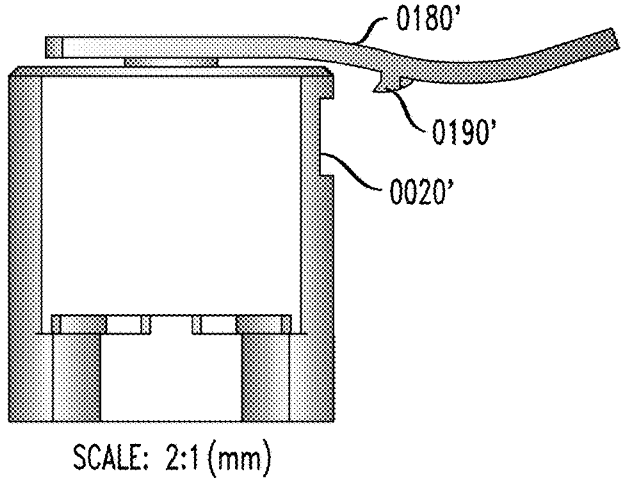
FIG. 13:02
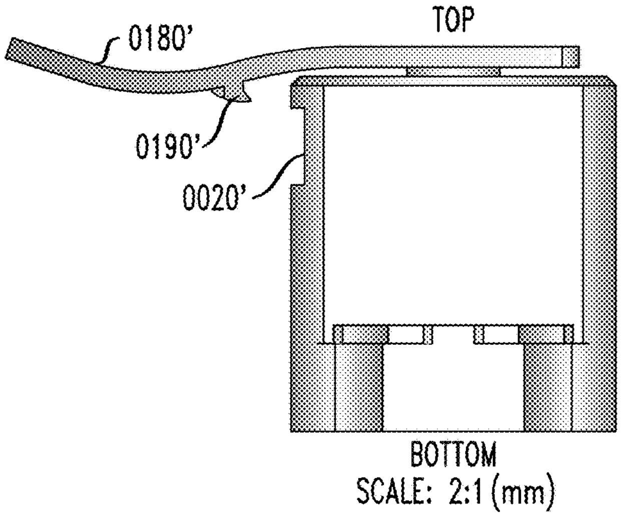
FIG. 13:03
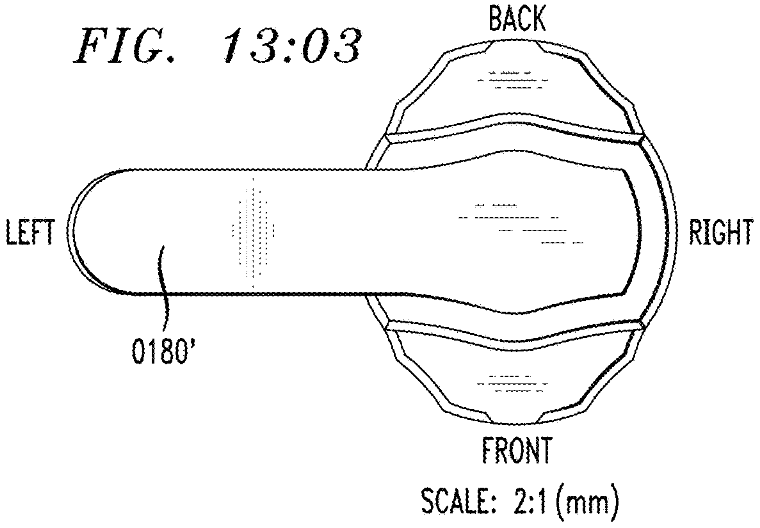

FIG. 14:02
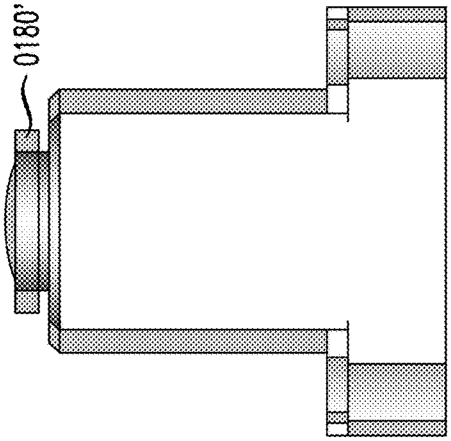
SCALE: 2:1 (mm)
FIG. 14:03
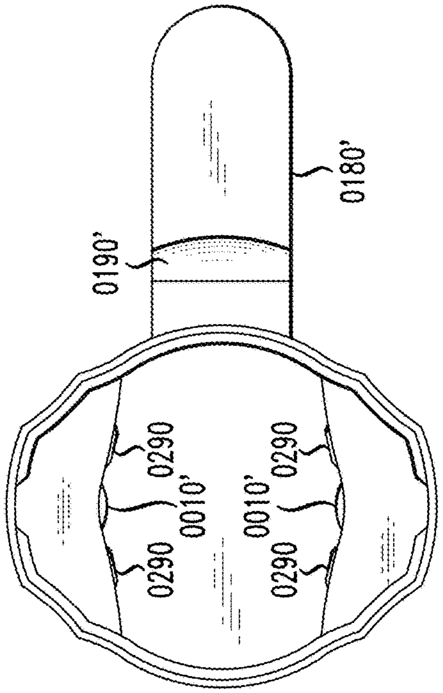
SCALE: 2:1 (mm)
FIG. 14:01
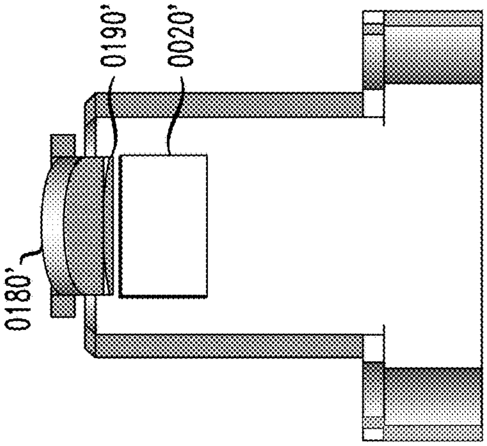
SCALE: 2:1 (mm)

FIG. 14:04
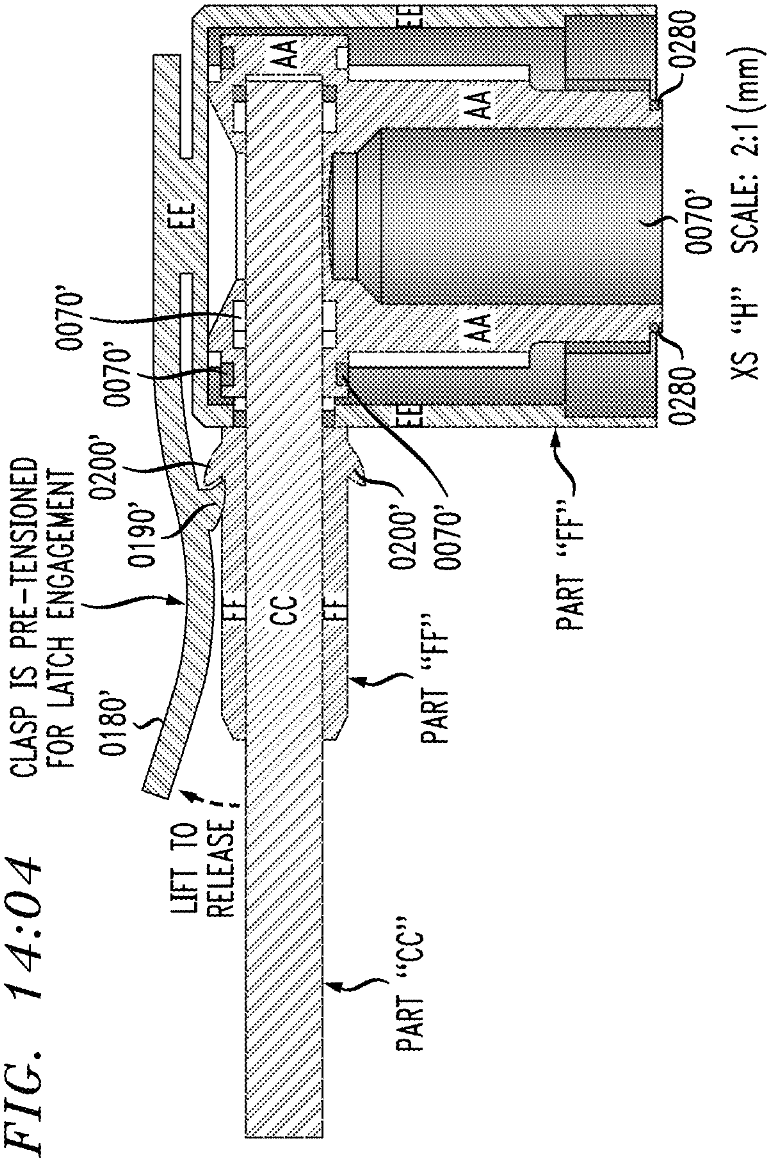
FIG. 14:05
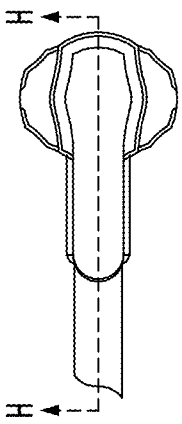

FIG. 15:01
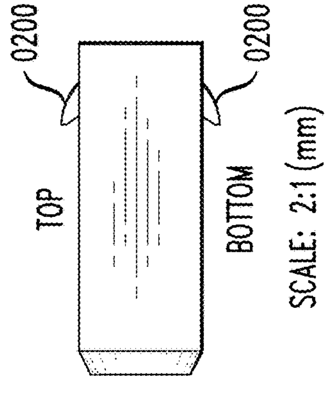
FIG. 15:02
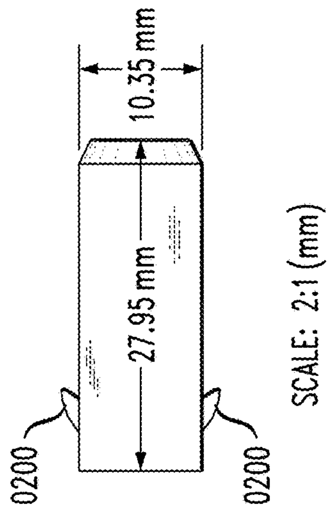
FIG. 15:03
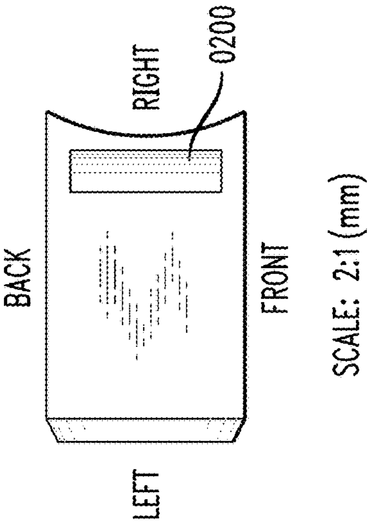
FIG. 15:04
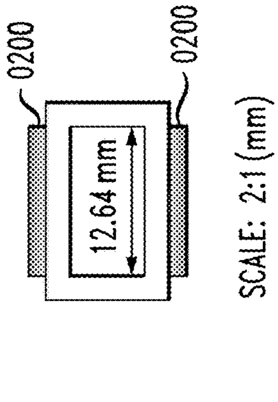
FIG. 15:05
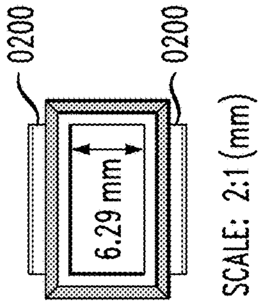
FIG. 15:06
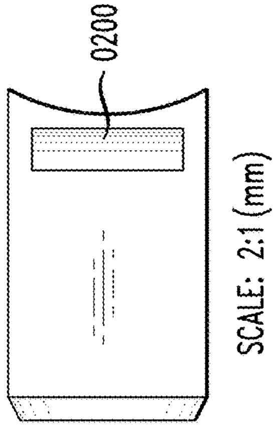

FIG. 15:09
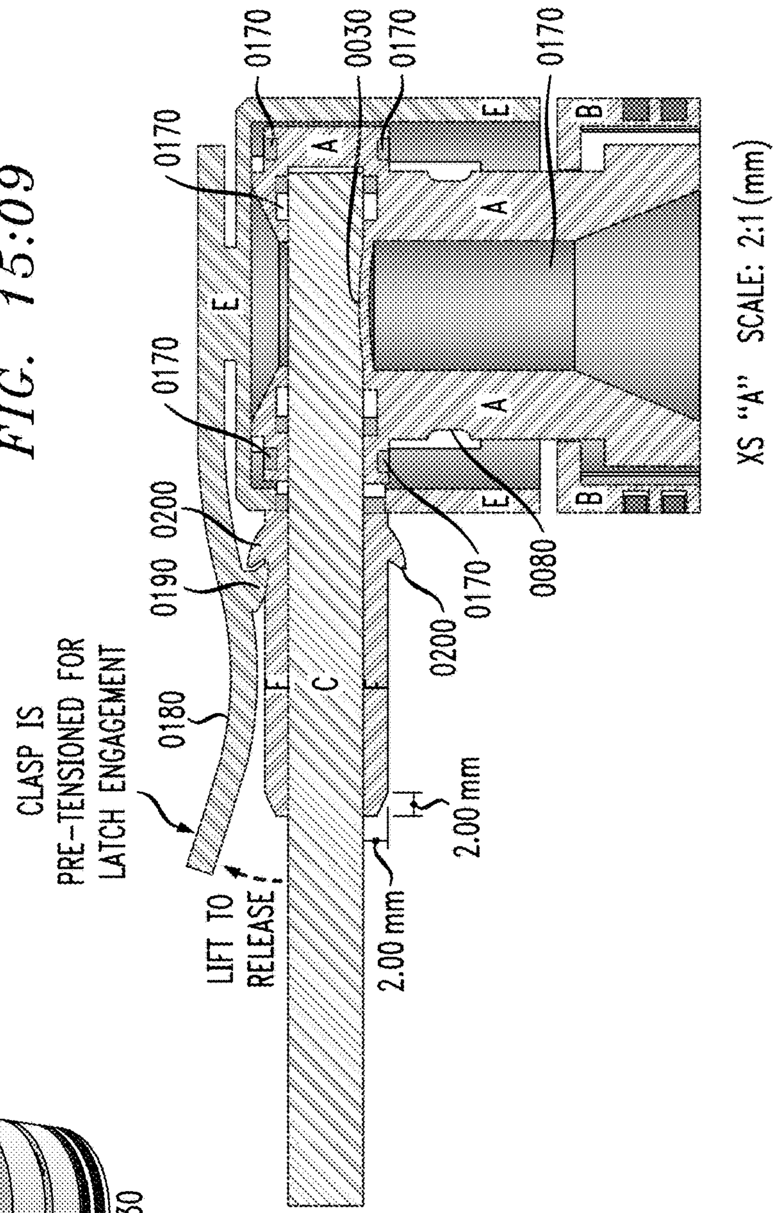
FIG. 15:07
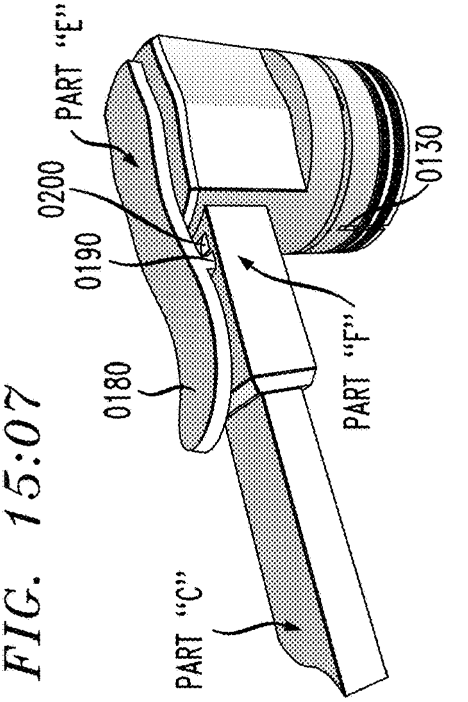
FIG. 15:08
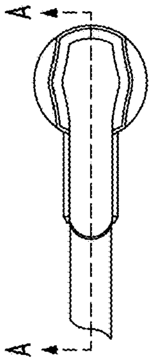

MOUNTING SYSTEM FOR USE IN CONNECTION WITH PAINTING

FIELD

The field relates generally to a mounting system for use in connection with painting and methods of using same.

BACKGROUND

In connection with kitchen remodeling, painting kitchen cabinets has become a popular less-expensive alternative to replacement of the cabinets. However, there are difficulties with providing adequate exposure of cabinet surfaces during the painting and subsequent drying processes.

SUMMARY

Illustrative embodiments provide a mounting system for use in connection with painting cabinet doors and drawers, and methods of using same. The mounting system includes devices that attach to cabinet doors and drawers to enable the cabinet doors and drawers to be suspended so that multiple surfaces of the doors and drawers can be exposed to be painted and to dry.

According to an embodiment, a mounting device comprises a collar part including a plurality of ramp portions on an interior side of the collar part, and a rotatable hub part comprising a plurality of protruding portions. The collar part is positioned around the rotatable hub part. When the rotatable hub part is rotated, respective ones of the plurality of protruding portions are configured to press against respective ones of the plurality of ramp portions and exert a force on the collar part which increases a dimension of the collar part.

According to an embodiment, a method for suspending a cabinet door to be painted comprises securing a mounting device including a rotatable hub part and a collar part formed around the rotatable hub part to the cabinet door, and suspending the cabinet door from a support rack via the mounting device. Securing the mounting device to the cabinet door comprises inserting a portion of the mounting device into a hinge hole of the cabinet door, and rotating the rotatable hub a designated number of degrees. Rotating the rotatable hub causes respective ones of a plurality of portions protruding from the rotatable hub to press against respective ones of a plurality of ramp portions on an interior surface of the collar part and exert a force on the collar part which increases a dimension of the collar part.

According to an embodiment, a mounting system for suspending a cabinet portion to be painted comprises a mounting device securable to the cabinet portion, and a support rod extending between the mounting device and a support rack. The support rod extends from the mounting device through a hole in the mounting device, and engages with the support rack to suspend the cabinet portion from the support rack via the mounting device in a cantilevered configuration.

BRIEF DESCRIPTION OF THE DRAWINGS

FIG. 01:01 shows an exploded view of a cabinet door mounting device in accordance with an embodiment.

FIG. 01:02 shows another exploded view of the cabinet door mounting device in accordance with an embodiment.

FIGS. 02:01 to 02:06 depict perspective views of steps for inserting and securing the cabinet door mounting device in a hinge recess of a cabinet door in accordance with an embodiment.

FIGS. 03:01 to 03:04 depict perspective and cross-sectional views of a cabinet door mounting device secured in a hinge recess of a cabinet door in accordance with an embodiment.

FIGS. 03:05 to 03:07 depict perspective views of cabinet doors secured on a drying rack and a spray rack via cabinet door mounting devices and corresponding handles in accordance with an embodiment.

FIG. 04:01 depicts a front view of the cabinet door mounting device in accordance with an embodiment.

FIG. 04:02 depicts a cross-sectional view of the cabinet door mounting device taken along the line A-A in FIG. 04:01 in accordance with an embodiment.

FIG. 04:03 depicts a left side view of the cabinet door mounting device in accordance with an embodiment.

FIG. 04:04 depicts a cross-sectional view of the cabinet door mounting device taken along the line B-B in FIG. 04:03 in accordance with an embodiment.

FIG. 05:01 depicts a back side view of the cabinet door mounting device in accordance with an embodiment.

FIG. 05:02 depicts a right side view of the cabinet door mounting device in accordance with an embodiment.

FIG. 05:03 depicts a cross-sectional view of the cabinet door mounting device taken along the line C-C in FIG. 05:01 in accordance with an embodiment.

FIG. 05:04 depicts a cross-sectional view of the cabinet door mounting device taken along the line D-D in FIG. 05:02 in accordance with an embodiment.

FIG. 06:01 depicts a top view of the cabinet door mounting device in accordance with an embodiment.

FIG. 06:02 depicts a bottom view of the cabinet door mounting device in accordance with an embodiment.

FIG. 06:03 depicts a cross-sectional view of the cabinet door mounting device taken along the line E-E in FIG. 05:02 in accordance with an embodiment.

FIG. 06:04 depicts a cross-sectional view of the cabinet door mounting device taken along the line F-F in FIG. 05:02 in accordance with an embodiment.

FIGS. 07:01, 07:02, 07:03, 07:04, 07:05 and 07:06 show front, back, top, left side, right side and bottom views, respectively, of part A of the cabinet door mounting device in accordance with an embodiment.

FIGS. 08:01, 08:02, 08:03, 08:04, 08:05 and 08:06 show front, back, top, left side, right side and bottom views, respectively, of part B of the cabinet door mounting device in accordance with an embodiment.

FIGS. 09:01, 09:02, 09:03, 09:04, 09:05 and 09:06 show left side, bottom, top, back side, right side and front views, respectively, of part E of the cabinet door mounting device in accordance with an embodiment.

FIG. 10:01 shows an exploded view of a cabinet drawer mounting device in accordance with an embodiment.

FIG. 10:02 shows another exploded view of the cabinet drawer mounting device in accordance with an embodiment.

FIGS. 11:01 to 11:04 depict perspective and cross-sectional views of a cabinet drawer mounting device secured to a cabinet drawer in accordance with an embodiment.

FIGS. 11:05 to 11:07 depict perspective views of cabinet drawers secured on a drying rack and a spray rack via cabinet drawer mounting devices and corresponding handles in accordance with an embodiment.

FIGS. 12:01, 12:02, 12:03, 12:04, 12:05 and 12:06 show front, back, top, left side, right side and bottom views, respectively, of part AA of the cabinet drawer mounting device in accordance with an embodiment.

FIGS. 13:01, 13:02 and 13:03 show back, front and top views, respectively, of part EE of the cabinet drawer mounting device in accordance with an embodiment.

FIGS. 14:01, 14:02 and 14:03 show left side, right side and bottom views, respectively, of part EE of the cabinet drawer mounting device in accordance with an embodiment.

FIG. 14:04 shows a cross-sectional view of parts AA, CC, EE and FF of the cabinet drawer mounting device taken along the line H-H in FIG. 14:05 in accordance with an embodiment.

FIG. 14:05 shows a top view of parts AA, CC, EE and FF of the cabinet drawer mounting device in accordance with an embodiment.

FIGS. 15:01, 15:02, 15:03, 15:04, 15:05 and 15:06 show front, back, top, right side, left side and bottom views, respectively, of part F of the cabinet door mounting device in accordance with an embodiment.

FIG. 15:07 shows a perspective view of parts C, E and F of the cabinet door mounting device in accordance with an embodiment.

FIG. 15:08 shows a top view of parts C, E and F of the cabinet door mounting device in accordance with an embodiment.

FIG. 15:09 shows a cross-sectional view of parts C, E and F of the cabinet door mounting device taken along the line A-A in FIG. 15:08 in accordance with an embodiment.

DETAILED DESCRIPTION

Referring to FIGS. 01:01 and 01:02, a mounting device used for suspending a cabinet door to be painted comprises a rotatable hub (Part "A"), a collar part (Part "B"), a support rod (Part "C"), one or more O-rings (Part "D"), a cover portion (Part "E") and a support rod sleeve (Part "F"). Part A is displayed in the unlocked position/orientation (0°). Parts A and B are displayed separately for purpose of clarity. In an illustrative embodiment, parts A and B are selective laser sintering (SLS) 3D printed as a captive set, yet free to rotate independently of one another. In the illustrative embodiment of FIG. 01:02, one of two O-rings (Part D) is depicted.

The rotatable hub A comprises one or more internal raised dimples 0030 to provide for a friction fit when the support rod C (also referred to herein as a "handle") is inserted into opening 0040 (also referred to herein as a "handle slot"). In illustrative embodiments, during manufacturing of the rotatable hub A, material adjacent the opening 0040 (e.g., pockets of material) is removed to facilitate insertion of support rod C into opening 0040 and also save material and/or three-dimensional (3D) printing costs.

Rotatable hub A further includes two notches 0050 on opposite sides of the rotatable hub A to receive corresponding tabs 0010 on an inside surface of cover portion E. The mating (e.g., interlocking) of the notches 0050 and the tabs 0010 secures the cover portion E, which functions as a paint shield, to the rotatable hub A. In order to remove the cover portion E from the rotatable hub A, the cover portion E can be squeezed in a horizontal direction to release the tabs 0010 from the notches 0050 and lifted vertically off of the rotatable hub A. Horizontal and vertically in this instance assume a particular orientation of the cover portion E and rotatable hub A. It is to be understood that the orientation may vary, in which case, horizontal and vertical designations may need to be changed to suit a current orientation of the mounting device. The cover portion E comprises a rectangular opening 0020, which corresponds to the rectangular opening 0040 in the rotatable hub A to receive the support rod C therethrough when the openings 0020 and 0040 are aligned. Although depicted as rectangular, the openings 0020 and 0040 are not necessarily limited to a rectangular shape, and may comprise a different shape (e.g., square) to accommodate a support rod C also having a shape other than rectangular.

Referring to FIGS. 02:01 to 02:06, a cabinet door (e.g., kitchen cabinet door) comprises a hinge hole such as, for example, an industry standard 35 mm diameter hinge hole commonly associated with what is referred to as a European hinge or "cup" hinge (see FIG. 02:01). The mounting device comprising the rotatable hub A and the collar part B is inserted into the hinge hole as shown in FIG. 02:02. The collar part B comprises one or more grooves 0120 to receive and secure respective O-rings D in place. As can be seen more clearly in FIGS. 04:01 and 04:03, the grooves 0120 include multiple raised portions (e.g., "ribs") to create a sine wave-like distortion of the O-rings D. The O-rings D resist torque and increase friction when the mounting device is secured in the hinge hole. In a non-limiting illustrative embodiment, the O-rings D comprise square-profile oil resistant buna-O-rings by McMaster Carr part number #4061t13, which can be installed on the collar part B by an end user.

Referring back to FIGS. 02:01 to 02:06, and to FIGS. 05:03, 05:04 and 06:02, in order to secure the mounting device in the hinge hole, the rotatable hub A is rotated a designated number of degrees (e.g., 90 degrees), wherein rotating the rotatable hub A causes respective ones of a plurality of portions 0150 protruding from the rotatable hub A to press against respective ones of a plurality of ramp portions 0160 on an interior surface of the collar part B and exert a force on the collar part B which increases a dimension (e.g., diameter or width) of the collar part B so that the collar part B is tightly fitted in the hinge hole. As can be seen, for example, in FIGS. 05:03 and 05:04, the ramp portions 0160 comprise wall portions of the collar part B which incrementally increase in thickness on an interior side of the collar part B and in a direction of rotation of the rotatable hub A. As can be seen in FIGS. 05:03 and 05:04, each of the ramp portions 0160 begins at a first stepped portion S1, and ends at a second stepped portion S2. The first stepped portion S1 is smaller (e.g., having less thickness) than the second stepped portion S2, which has a greater thickness than the first stepped portion S1. As can be seen in FIGS. 05:03 and 05:04, the protruding portions 0150 comprise areas (e.g., lobes) of increased diameter of the rotatable hub A. Each of the protruding portions 0150 start/end at stepped portions S3 and S4. In an illustrative embodiment, as can be seen in FIGS. 05:03 and 05:04, when in the unlocked position (e.g., 0°), the rotatable hub is prevented from rotating in one direction (e.g., clockwise or counter-clockwise depending on view) by engagement of second stepped portions S2 on the ramp portions 0160 with stepped portions S4 on the protruding portions 0150.

In an illustrative embodiment, a small amount of lubricant (e.g., petroleum jelly) is initially applied to surfaces of the protruding portions 0150 and ramp portions 0160. Lubricant can be used for an initial "break-in," period and handle (support rod C) is temporarily used to aid with locking. Once the "break-in" period is completed, use of the handle may not be necessary.

Increasing the dimension of the collar part B causes the O-rings D disposed around the exterior side of the collar part B to contact an inside wall of the hinge hole. The mounting device (e.g., diameter or width of the collar part B) is dimensioned to be insertable into and removeable from a hinge hole in a cabinet door when the rotatable hub A is in a first position without the respective ones of the plurality of protruding portions 0150 pressing against the respective ones of the plurality of ramp portions 0160. The mounting device (e.g., diameter or width of the collar part B) is dimensioned to be secured in the hinge hole in the cabinet door when the rotatable hub A is in a second position where the respective ones of the plurality of protruding portions 0150 are pressing against the respective ones of the plurality of ramp portions 0160. The protruding portions 0150 (also referred to herein as "lobes") on the rotatable hub A are configured to apply a predetermined linear force on the plurality of ramp portions 0160, which is, for example, applied in a direction parallel to an edge of the cabinet door when fully engaged (e.g., upon 90° rotation) (sec FIG. 03:03). The plurality of ramp portions 0160 receive the force applied by the plurality of protruding portions 0150, which is transmitted to the O-rings D, binding the mounting device to the hinge hole wall. Referring, for example, to FIGS. 01:01, 04:03, 05:03, 05:04, 06:02-06:04 and 08:06, the collar part B comprises one or more relief slots 0130 to permit the increase of the dimension of the collar part when the force is exerted on the collar part B. The collar part B is formed from a flexible material to enable the increase in dimension of the collar part B so that the collar part B is wedged in the hinge hole as a result of the O-rings D contacting the wall of the hinge hole at multiple points of contact.

In a non-limiting illustrative embodiment, the collar part B comprises nylon (PA12) and is 3D selective laser sintering (SLS) printed. In addition, in a non-limiting illustrative embodiment, the rotatable hub A, cover portion E and support rod sleeve F also comprise nylon (PA12) and are 3D SLS printed. Referring to FIGS. 01:01, 03:03, 04:01, 04:03, 04:04, 05:01, 05:02, 07:01, 07:02, 07:04 and 07:05, the rotatable hub A includes a groove 0080 to facilitate 3D printing of the rotatable hub A and collar part B to meet and/or exceed 3D printing loose shell minimum required tolerances. Referring to FIGS. 01:02, 03:03, 04:02, 04:04, 06:01, 07:03, 07:02, 07:06 and 15:09, the rotatable hub A further includes hollowed out portions or voids 0170 where applicable for material stability, to save material and/or lower printing costs. In FIGS. 07:03 and 7:04, rotatable hub A (part A) is depicted in the unlocked position (0°) and in FIGS. 07:01-07:06, collar part B is not shown.

The rotatable hub A is rotated the designated number of degrees with respect to the collar part B until respective ones of the one or more first stop portions 0090 on the rotatable hub part engage with respective ones of the one or more second stop portions 0100 on the collar part B and stop rotation of the rotatable hub part A. In an illustrative embodiment, referring to FIGS. 01:01, 06:03 and 06:04, the first stop portions 0090 include two stepped portions (e.g., "bump stops") on an exterior side of the rotatable hub A to prevent over rotation of the rotatable hub A beyond the designated number of degrees (e.g., 90°) when the rotatable hub A is turned to a locked position where the first stop portions 0090 make contact with the second stop portions 0100. In an illustrative embodiment, referring to FIGS. 01:01, 06:03 and 06:04, the second stop portions 0100 include two stepped portions (e.g., "bump stops") on an interior side of the collar part B to prevent over rotation of the rotatable hub A beyond the designated number of degrees (e.g., 90°) when the rotatable hub A is turned to the locked position where the first stop portions 0090 make contact with the second stop portions 0100. In the locked position, the mounting device is secured in the hinge hole.

Referring, for example, to FIGS. 01:01, 02:02-02:05, 03:03, 04:01-04:04, 05:01, 05:02, 06:01, 07:04, 07:05 and 08:01-08:03, rotatable hub A further includes one or more notches 0060 that act as visual cues as to fully locked status during and/or after 90° rotation of part rotatable hub A. Respective ones of the notches 0060 align with respective ones of the notches 0070 on collar part B, which also act as visual cues as to fully locked status during and/or after 90° rotation of rotatable hub A.

Referring, for example, to FIGS. 01:01, 02:05, 03:03, 04:01-04:03, 05:01, 05:02, 06:01, 08:01-08:05 and 09:02, the cover portion E comprises two internal slots 0140 to receive raised tabs 0110 of the collar part B when the mating of the notches 0050 and the tabs 0010 secures the cover portion E to the rotatable hub A. As a result, rotatable hub A and collar part B are prevented from unlocking from each other. The two raised tabs 0110 act: (1) as visual alignment guides (tabs parallel to door edge); (2) as installation tool engagement points; and (3) as cover portion E interlocking points. In FIGS. 04:01-04:04 and 05:01-05:04, the mounting device is depicted in the unlocked position (0°) and Part E and O-rings D are not shown. In FIGS. 06:01-06:04, the mounting device is depicted in the unlocked position (0°) and Part E is not shown. In FIGS. 08:01-08:06, rotatable hub A is not shown.

Referring to FIGS. 01:01, 01:02, 03:01, 03:02, 09:01-09:06 and 15:01-15:09, the rotatable hub A and the cover portion E each comprise openings (e.g., holes) 0040 and 0020, which when aligned are configured to receive the support rod C. A support rod sleeve F is formed around part of the support rod C and a latching element 0180 is disposed on top of the cover portion E. The latching element, which is pre-tensioned, includes a latch hook 0190 which engages with a recess 0200 in the support rod sleeve F to secure the support rod C. In an illustrative embodiment, support rod C can be further secured to support rod sleeve F through a "press-fit" type of installation. In FIGS. 09:01-09:06, cover portion E is shown when the mounting device is in a locked position.

Referring to FIGS. 03:05-03:07, the support rod C extends from the mounting device and is configured to connect to a support rack so that a cabinet door to which the mounting device is secured can be supported from the support rack in a cantilevered configuration. More specifically, in FIG. 03:05, the support rack is a drying rack configured to hold multiple cabinet doors, and in FIGS. 03:06-03:07, the support rack is a spray rack configured to hold one cabinet door to be painted. As can be seen in FIGS. 03:05-03:07, the cabinet doors can be supported by two mounting devices and two corresponding support rods C, which are attached between two offset horizontal members of a support rack. The drying rack includes multiple pairs of offset horizontal members mounted on front and rear sides of vertical members, while the spray rack includes one pair of offset horizontal members. The front face of the cabinet doors can face upward or downward (compare FIGS. 03:06 and 03:07) when mounted on the spray rack via the support rods C depending on which side is to be painted. In illustrative embodiments, the support rod C comprises a ¼"×½"×12" cold rolled steel handle.

Referring to FIGS. 10:01 and 10:02, a mounting device used for suspending a cabinet drawer to be painted comprises a hub (Part "AA"), a support rod (Part "CC"), a cover portion (Part "EE") and a support rod sleeve (Part "FF"). The hub AA comprises one or more internal raised dimples

0030' to provide for a friction fit when the support rod CC (also referred to herein as a "handle") is inserted into opening 0040' (also referred to herein as a "handle slot"). In illustrative embodiments, during manufacturing of the hub AA, material adjacent the opening 0040' (e.g., pockets of material) is removed to facilitate insertion of support rod CC into opening 0040' and also save material and/or 3D printing costs. Part FF may be the same as Part F.

Hub AA further includes two notches 0050' on opposite sides of the hub AA to receive corresponding tabs 0010' on an inside surface of cover portion EE. The mating (e.g., interlocking) of the notches 0050' and the tabs 0010' secures the cover portion EE, which functions as a paint shield, to the hub AA. In order to remove the cover portion EE from the hub AA, the cover portion EE can be squeezed in a horizontal direction to release the tabs 0010' from the notches 0050' and lifted vertically off of the hub AA. Horizontal and vertically in this instance assume a particular orientation of the cover portion EE and hub AA. It is to be understood that the orientation may vary, in which case, horizontal and vertical designations may need to be changed to suit a current orientation of the mounting device. The cover portion EE comprises a rectangular opening 0020', which corresponds to the rectangular opening 0040' in the hub AA to receive the support rod CC therethrough when the openings 0020' and 0040' are aligned. Although depicted as rectangular, the openings 0020' and 0040' are not necessarily limited to a rectangular shape, and may comprise a different shape (e.g., square) to accommodate a support rod CC also having a shape other than rectangular.

Referring to FIGS. 11:01 to 11:07, the hub AA (also referred to herein as a "base portion") is secured to a cabinet drawer via one or more fasteners (e.g., screws). For example, in a non-limiting illustrative embodiment, the one or more fasteners comprise pan head wood screw(s) where the screw length is less than the total depth of hub AA combined with the drawer thickness. The fasteners are driven through holes 0260 (e.g., 4.75 mm diameter holes). In a non-limiting illustrative embodiment, the hub AA, cover portion EE and support rod sleeve FF comprise nylon (PA12) and are 3D SLS printed. Referring to FIGS. 10:02, 11:03, 12:03 and 12:06, the hub AA further includes hollowed out portions or voids 0070' where applicable for material stability, to save material and/or lower printing costs. Referring to FIGS. 10:01, 10:02, 11:03, 12:01, 12:02 and 12:06, the hub AA comprises an offset 0280 to eliminate paint "bridging" between hub AA and the cabinet drawer. In one or more embodiments, the offset is 1 mm high×1.5 mm wide. Referring, for example, to FIGS. 10:01 and 14:03, the cover portion EE comprises tabs 0290 to keep cover portion EE centered and tabs 0010' interlocked with notches 0050'.

Referring to FIGS. 10:01, 10:02, 11:02, 11:03, 13:01-13:03 and 14:01-14:05, the hub part AA and the cover portion EE each comprise openings (e.g., holes) 0040' and 0020', which when aligned are configured to receive the support rod CC. A support rod sleeve FF is formed around part of the support rod CC and a latching element 0180' is disposed on top of the cover portion EE. The latching element 0180', which is pre-tensioned, includes a latch hook 0190' which engages with a recess 0200' in the support rod sleeve FF to secure the support rod CC.

Referring to FIGS. 11:02 and 11:05-11:07, the support rod CC extends from the mounting device and is configured to connect to a support rack so that a cabinet drawer to which the mounting device is secured can be supported from the support rack in a cantilevered configuration. More specifically, in FIG. 11:05, the support rack is a drying rack configured to hold multiple cabinet drawers, and in FIGS. 11:06-11:07, the support rack is a spray rack configured to hold one cabinet drawer to be painted. As can be seen in FIGS. 11:05-11:07, the cabinet drawers can be supported by two mounting devices and two corresponding support rods CC, which are attached between two offset horizontal members of a support rack. The drying rack includes multiple pairs of offset horizontal members mounted on front and rear sides of vertical members, while the spray rack includes one pair of offset horizontal members. The front face of the cabinet drawers can face upward or downward (compare FIGS. 11:06 and 11:07) when mounted on the spray rack via the support rods CC, depending on which side of the drawer is to be painted. In illustrative embodiments, the support rod CC comprises a ¼"×½"×12" cold rolled steel handle.

In the description above, various materials, dimensions and processing parameters for different elements are provided. Unless otherwise noted, such materials are given by way of example only and embodiments are not limited solely to the specific examples given. Similarly, unless otherwise noted, all dimensions and process parameters are given by way of example and embodiments are not limited solely to the specific dimensions or ranges given. In illustrative embodiments, it is to be understood that the dimensions of the mounting device (e.g., collar part B) must be close to the diameter of a given hinge hole (e.g., 35 mm) in order to achieve a secure fit of the mounting device in the given hinge hole. For example, FIG. 04:02 indicates an end-to-end diameter of the collar part B plus groove portions for the O-rings D of 34.90 mm to be used in the case of a hinge hole that is 35 mm. However, depending on the size of the ramp portions 0160 and/or protruding portions 0150, as well as the size of the hinge hole, the end-to-end diameter of the collar part B plus the groove portions for the O-rings D may vary.

Although exemplary embodiments of the present invention have been described hereinabove, it should be understood that the present invention is not limited to these embodiments, but may be modified by those skilled in the art without departing from the spirit and scope of the present invention. For example, although discussed in terms of a mounting system for use in connection with painting, the embodiments are not necessarily limited to mounting systems for painting. In more detail, for example, the rotatable hub A including protruding portions 0150 and the collar part B including the plurality of ramp portions 0160, as described hereinabove, may be used for mounting and/or securing devices in applications other than painting where a mounting device is to be secured in a hole. It is to be understood that the functionality described herein may be applied to other embodiments as enhancements or improvements as the design becomes progressively elaborative.

The following tables 1 and 2 include part identifiers (IDs) and descriptions in illustrative embodiments.

TABLE 1

| IDs | Descriptions |
|---|---|
| PART A | NYLON (PA12) 3D SLS PRINTED CABINET DOOR TOOL "HUB" |
| PART B | NYLON (PA12) 3D SLS PRINTED "FLEXIBLE COLLAR" |
| PART C | ¼" × ½" × 12" COLD ROLLED STEEL HANDLE. (SOURCED LOCALLY/ CUT LENGTH TO PREFERENCE/FILE SMOOTH ALL ROUGH EDGES) |
| PART D | (2) O-Rings by McMaster Carr Part Number #4061T13 (Square-Profile Oil Resistant Buna-O-Ring) TO BE INSTALLED BY END USER |
| PART E | NYLON (PA12) 3D SLS PRINTED, FORM FIT, "PAINT SHIELD" *PAINT SHIELD ALSO SERVES AS TOOL LOCKING MECHANISM (LOCKS TOOL PARTS: "A" \| "B" \| "C" \| & "F" TOGETHER) |
| PART F | NYLON (PA12) 3D SLS PRINTED, "PRESS FIT" LATCH COLLAR on PART "C" TO ENGAGE PART "E" LATCH |
| 0010 | (2) INTERNAL RAISED TABS INTERLOCK WITH 0050 NOTCHES IN PART "A" (When Locked @ 90°) PAINT SHIELD TAB INTERLOCK IS RELEASED BY SQUEEZING PERPENDICULAR TO RAISED TABS |
| 0020 | RECTANGULAR OPENING IN PAINT SHIELD FOR STEEL HANDLE PART "C" |
| 0030 | (1) INTERNAL RAISED DIMPLE to PROVIDE FOR A "FRICTION FIT" WHEN PART "C" IS INSERTED |
| 0040 | RECTANGULAR HANDLE SLOT WITH INTERNAL/ADJACENT "POCKETS" OF MATERIAL REMOVED TO EASE INSERTION OF HANDLE PART "C" INTO PART "A" & SAVE MATERIAL/PRINTING COSTS. |
| 0050 | (2) NOTCHES TO RECEIVE 0010 TABS IN PART "E" TO SECURE PAINT SHIELD TO PART "A" (SQUEEZE PERPENDICULAR TO RELEASE/LIFT VERTICALLY to REMOVE) |
| 0060 | (2) NOTCHES ACT AS VISUAL CUES AS TO FULLY LOCKED STATUS DURING/AFTER 90° ROTATION OF PART "A" (ALIGN W/0070) |
| 0070 | (2) NOTCHES ACT AS VISUAL CUES AS TO FULLY LOCKED STATUS DURING/AFTER 90° ROTATION OF PART "A" (ALIGN W/0060) |
| 0080 | PURPOSE OF GROOVE IS TO FACILITATE 3D PRINTING OF CAPTIVE PARTS "A" & "B" (to MEET/EXCEED 3D PRINTING LOOSE SHELL MINIMUM REQUIRED TOLERANCES) |
| 0090 | (2) RAISED "BUMP STOPS" ON PART "A" ARE TO PREVENT OVER ROTATION OF PART "A" BEYOND 90° WHEN "A" IS TURNED TO LOCKED POS. (0090 MAKES CONTACT WITH 0100) |
| 0100 | (2) RAISED "BUMP STOPS" ON (STATIC) PART "B" ARE TO PREVENT OVER ROTATION OF PART "A" BEYOND 90° WHEN "A" IS TURNED TO LOCKED POS. (0090 MAKES CONTACT WITH 0100) |
| 0110 | (2) RAISED TABS ACT (1) AS VISUAL ALIGNMENT GUIDES (TABS PARALLEL TO DOOR EDGE) (2) AS INSTALLATION ENGAGEMENT POINTS (3) AS PAINT SHIELD INTERLOCKING POINTS |
| 0120 | (2) O-RING GROOVES WITH MULTIPLE RAISED "RIBS" ARE TO CREATE A "SINE WAVE" DISTORTION OF O-RINGS WHEN 90° LOCKING FORCE IS APPLIED (TO RESIST TORQUE/SLIP @ TOOL/HOLE WALL) |
| 0130 | (2) MATERIAL RELIEF SLOTS ARE TO PERMIT THE NECESSARY EXPANSION WHEN 90° LOCK FORCE IS APPLIED OUTWARD (Please See XS Detail 03:03) |
| 0140 | (2) INTERNAL SLOTS TO RECEIVE 0110 RAISED TABS AND WHEN ALSO SECURED BY ENGAGEMENT OF 0010 & 0050, PARTS "A" & "B" ARE PREVENTED FROM UNLOCKING |
| 0150 | (2) LOBES ON PART "A" TO APPLY A SET LINEAR FORCE ON PART "B" 0160 "RAMPS". FORCE TO BE PARALLEL TO THE CAB. DOOR EDGE WHEN FULLY ENGAGED (+90°/LOCK\|See XS Detail 03:03) |
| 0160 | (2) "RAMPS" ON PART "B" RECEIVE LINEAR FORCE APPLIED BY 0150 LOBES ON PART "A" AND TRANSMIT SAME FORCE TO BOTH PARTS "B" & "D" BINDING TOOL TO 35 mm HINGE HOLE WALL |
| 0170 | HOLLOW/VOIDS WHERE APPLICABLE for MATERIAL STABILITY/SAVE MAT./LOWER PRINTING COSTS |
| 0180 | PART "E" INTEGRAL PRE-TENSIONED HANDLE LATCH |
| 0190 | PART "E" LATCH HOOK |
| 0200 | PART "F" LATCH HOOK |

TABLE 2

| IDs | Descriptions |
|---|---|
| PART AA | NYLON (PA12) 3D SLS PRINTED CABINET DRAWER FRONT "HUB" |
| PART EE | NYLON (PA12) 3D SLS PRINTED, FORM FIT, "PAINT SHIELD" *PAINT SHIELD ALSO SERVES AS TOOL LOCKING MECHANISM (LOCKS PARTS "AA" & "EE" TOGETHER |

TABLE 2-continued

| IDs | Descriptions |
|---|---|
| PART FF | NYLON (PA12) 3D SLS PRINTED, "PRESS FIT" LATCH COLLAR on PART "CC" TO ENGAGE PART "EE" LATCH |
| PART CC | ¼" × ½" × 12" COLD ROLLED STEEL HANDLE [*HANDLE LOCK option UNDER DEVELOPMENT) (SOURCED LOCALLY/CUT LENGTH TO PREFERENCE/FILE SMOOTH ALL ROUGH EDGES) |
| 0010' | (2) INTERNAL RAISED TABS INTERLOCK WITH 0050' NOTCHES IN PART "AA" PAINT SHIELD TAB INTERLOCK IS RELEASED BY SQUEEZING PERPENDICULAR TO RAISED TABS |
| 0020' | RECTANGULAR OPENING IN PAINT SHIELD FOR HANDLE PART "CC" |
| 0030' | (1) INTERNAL RAISED DIMPLE to PROVIDE FOR A "FRICTION FIT" WHEN PART "CC" IS INSERTED [*HANDLE FRICTION FIT IS IN DEVELOPMENT W/SINGLE DIMPLE & DOUBLE DIMPLE versions) |
| 0040' | RECTANGULAR HANDLE SLOT WITH INTERNAL/ADJACENT "POCKETS" OF MATERIAL REMOVED TO EASE INSERTION OF HANDLE PART "CC" INTO PART "AA" |
| 0050' | (2) NOTCHES TO RECEIVE 0010' TABS IN PART "EE" TO SECURE PAINT SHIELD TO PART "AA" PART "CC" (SQUEEZE PERPENDICULAR TO RELEASE/LIFT VERTICALLY to REMOVE) |
| 0260 | 4.75 mm DIAMETER HOLE for PAN HEAD WOOD SCREW(S) [by other] to ATTACH PART "AA" to the CABINET DRAWER FRONT (*Screw length not to exceed total depth of Part "AA" + Drawer Thickness) |
| 0280 | 1 mm HIGH × 1.5 mm OFFSET to ELIMINATE PAINT "BRIDGING" BETWEEN PART "AA" & DRAWER FRONT |
| 0070' | HOLLOW/VOIDS WHERE APPLICABLE for MATERIAL STABILITY/SAVE MAT./LOWER PRINTING COSTS |
| 0290 | TABS to KEEP PART "EE" CENTERED & 0010' INTERLOCKED W/0050' |
| 0180' | PART "EE" INTEGRAL PRE-TENSIONED HANDLE LATCH |
| 0190' | PART "EE" LATCH HOOK |
| 0200' | PART "FF" LATCH HOOK |

What is claimed is:

1. A mounting device comprising:

a collar part comprising a plurality of ramp portions on an interior side of the collar part; and a rotatable hub part comprising a plurality of protruding portions;

wherein the collar part is positioned around the rotatable hub part;

wherein, when the rotatable hub part is rotated, respective ones of the plurality of protruding portions are configured to press against respective ones of the plurality of ramp portions and exert a force on the collar part which increases a dimension of the collar part; and wherein a portion of the rotatable hub part comprises a hole configured to receive a support rod, and a recess of a sleeve formed around part of the support rod is configured to engage with a latching element disposed on top of the mounting device.

2. The mounting device of claim 1 wherein:

the mounting device is dimensioned to be insertable into and removeable from a hinge hole in a cabinet door when the rotatable hub part is in a first position without the respective ones of the plurality of protruding portions pressing against the respective ones of the plurality of ramp portions.

3. The mounting device of claim 2 wherein:

the mounting device is dimensioned to be secured in the hinge hole in the cabinet door when the rotatable hub part is in a second position where the respective ones of the plurality of protruding portions are pressing against the respective ones of the plurality of ramp portions.

4. The mounting device of claim 1 wherein the collar part comprises one or more O-rings around an exterior side of the collar part.

5. The mounting device of claim 4 wherein the collar part comprises a plurality of raised edges on the exterior side of the collar part on which the one or more O-rings are positioned.

6. The mounting device of claim 1 wherein the collar part comprises one or more slots to permit the increase of the dimension of the collar part when the force is exerted on the collar part.

7. The mounting device of claim 1 wherein the rotatable hub part comprises one or more first stop portions configured to engage with one or more second stop portions on the collar part and stop rotation of the rotatable hub part at a designated stopping point.

8. The mounting device of claim 1 wherein the support rod extends from the mounting device and is configured to connect to a support rack.

9. The mounting device of claim 1 further comprising a cover sized to fit over a portion of the rotatable hub part.

10. A method for suspending a cabinet door to be painted, comprising:

securing a mounting device comprising a rotatable hub part and a collar part formed around the rotatable hub part to the cabinet door, wherein a portion of the rotatable hub part comprises a hole configured to receive a support rod, and a recess of a sleeve formed around part of the support rod is configured to engage with a latching element disposed on top of the mounting device; and suspending the cabinet door from a support rack via the mounting device;

wherein securing the mounting device to the cabinet door comprises:

inserting a portion of the mounting device into a hinge hole of the cabinet door; and rotating the rotatable hub part a designated number of degrees, wherein rotating the rotatable hub part causes respective ones of a plurality of portions protruding from the rotatable hub part to press against respective ones of a plurality of ramp portions on an interior surface of the collar part and exert a force on the collar part which increases a dimension of the collar part.

11. The method of claim 10 wherein increasing the dimension of the collar part causes one or more O-rings disposed around an exterior side of the collar part to contact an inside wall of the hinge hole.

12. The method of claim 10 wherein rotating the rotatable hub part the designated number of degrees comprises rotating the rotatable hub part with respect to the collar part until one or more first stop portions on the rotatable hub part engage with one or more second stop portions on the collar part and stop rotation of the rotatable hub part.

13. The method of claim 10 wherein suspending the cabinet door from the support rack via the mounting device comprises:

inserting the support rod into the hole formed in the portion of the rotatable hub part such that the recess of the sleeve engages with the latching element; and connecting the support rod to the support rack, wherein the support rod extends between the mounting device and the support rack.

14. A mounting system for suspending a cabinet portion to be painted comprising:

a mounting device securable to the cabinet portion; and a support rod extending between the mounting device and a support rack;

wherein the support rod extends from the mounting device through a hole in the mounting device;

wherein the support rod engages with the support rack to suspend the cabinet portion from the support rack via the mounting device in a cantilevered configuration; and wherein the cabinet portion comprises a cabinet drawer and the mounting system comprises a base portion securable to the cabinet drawer via one or more fasteners, and further wherein an interior surface of the base portion comprises one or more dimples configured to contact the support rod to provide a friction fit of the support rod to the base portion.

15. The mounting system of claim 14 wherein the cabinet portion comprises a cabinet door and the mounting device comprises:

a collar part comprising a plurality of ramp portions on an interior side of the collar part; and a rotatable hub part comprising a plurality of protruding portions;

wherein the collar part is positioned around the rotatable hub part; and wherein, when the rotatable hub part is rotated, respective ones of the plurality of protruding portions are configured to press against respective ones of the plurality of ramp portions and exert a force on the collar part which increases a dimension of the collar part.

16. The mounting system of claim 15 wherein:

the mounting device is dimensioned to be secured in a hinge hole in the cabinet door when the rotatable hub part is in a position where the respective ones of the plurality of protruding portions are pressing against the respective ones of the plurality of ramp portions.

17. The mounting system of claim 15 wherein the collar part comprises one or more slots to permit the increase of the dimension of the collar part when the force is exerted on the collar part.

* * * * *